United States Patent [19]
Ito et al.

[11] Patent Number: 5,908,465
[45] Date of Patent: Jun. 1, 1999

[54] NAVIGATION SYSTEM FOR DISPLAYING A STRUCTURE-SHAPE MAP

[75] Inventors: Yasunobu Ito; Mitsuhiro Nimura; Seiji Hayashi, all of Anjo, Japan

[73] Assignee: Aisin AW Co., Ltd., Anjo, Japan

[21] Appl. No.: 08/721,199

[22] Filed: Sep. 27, 1996

[30] Foreign Application Priority Data

| Sep. 27, 1995 | [JP] | Japan | 7-249227 |
| Sep. 27, 1995 | [JP] | Japan | 7-249969 |
| Oct. 31, 1995 | [JP] | Japan | 7-282738 |
| Apr. 26, 1996 | [JP] | Japan | 8-108147 |

[51] Int. Cl.$^6$ .............................. G01C 21/00; G08G 1/09
[52] U.S. Cl. ........................................... 701/211; 340/995
[58] Field of Search ..................... 701/201, 208, 701/211; 340/995

[56] References Cited

U.S. PATENT DOCUMENTS

| 4,570,227 | 2/1986 | Tachi et al. | 364/444 |
| 5,067,081 | 11/1991 | Person | 364/444 |
| 5,278,946 | 1/1994 | Shimada et al. | 395/62 |
| 5,293,163 | 3/1994 | Kakihara et al. | 340/995 |
| 5,297,051 | 3/1994 | Arakawa et al. | 364/449 |
| 5,448,696 | 9/1995 | Shimada et al. | 395/161 |

FOREIGN PATENT DOCUMENTS

| A-579-451 | 1/1994 | European Pat. Off. . |
| A-37-44-533 | 7/1989 | Germany . |
| A-42-19-171 | 1/1993 | Germany . |

OTHER PUBLICATIONS

Proceedings of the Vehicle Navigation and Information Systems Conference.. Sep. 11–13, 1989, "GDF, A Proposed Standard for Digital Road Maps to be Used in Car navigation Systems".

*Primary Examiner*—Michael Zanelli
*Attorney, Agent, or Firm*—Oliff & Berridge, PLC

[57] ABSTRACT

Road or other guidance is provided by displaying a structure-shape map showing building shapes and roads. Drawing of building shapes on the map is restricted according to a specific condition, e.g. the travel condition of the vehicle, or the screen scroll mode, by setting the display color for building shapes to the same color as that for a background, or by not drawing any of them, thereby preventing the screen from becoming difficult to see even during scrolling. For the structure-shape map, a storage device (3) stores map data having a name and a coordinate string for each shape of various structures and information belonging to each structure. A guidance controller (4) decides colors, color densities, patterns thereof, etc. for shapes as display modes on the basis of information belonging to the structures, e.g. the classification and height of each structure, and other detailed information (e.g. scale of construction), retrieves information belonging to a structure concerned, together with information regarding surroundings, and displays, on a display (12), shapes and names according to the decided display modes, thereby giving guidance. The structure-shape map may be displayed centered on a structure having a telephone number retrieved by entry of the telephone number.

28 Claims, 26 Drawing Sheets

FIG.2(A)

SUGGESTED-ROAD DATA

| | NUMBER (n) OF ROADS |
|---|---|
| 1 | ROAD NO. |
| | LENGTH |
| | ROAD-ATTRIBUTE DATA |
| | SHAPE-DATA ADDRESS, SIZE |
| | GUIDANCE DATA ADDRESS, SIZE |
| ⋮ | ⋮ |
| n | |

FIG.2(B)

SUGGESTED-ROAD DATA

| | NUMBER (m) OF NODES |
|---|---|
| 1 | EAST LONGITUDE |
| | NORTH LATITUDE |
| ⋮ | ⋮ |
| m | |

FIG.2(C)

GUIDANCE DATA

| INTERSECTION NAME |
|---|
| PRECAUTION DATA |
| ROAD NAME DATA |
| ROAD-NAME AUDIO DATA ADDRESS, SIZE |
| DESTINATION DATA ADDRESS, SIZE |

FIG.2(D)

DESTINATION DATA

| | NUMBER (k) OF DESTINATIONS |
|---|---|
| 1 | DESTINATION ROAD NO. |
| | DESTINATION NAME |
| | DESTINATION-NAME AUDIO DATA ADDRESS & SIZE |
| | DESTINATION DIRECTION DATA |
| | TRAVEL GUIDANCE DATA |
| ⋮ | ⋮ |
| n | |

FIG.2(E)

DESTINATION DIRECTION DATA

- −1 : INVALIDITY
- 0 : DISUSED
- 1 : STRAIGHT AHEAD
- 2 : RIGHTWARD DIRECTION
- 3 : DIAGONALLY RIGHTWARD DIRECTION
- 4 : DIRECTION TO RETURN TO RIGHT
- 5 : LEFTWARD DIRECTION
- 6 : DIAGONARY LEFTWARD DIRECTION
- 7 : DIRECTION TO RETURN TO LEFT

ROAD-ATTRIBUTE DATA — YES/NO INFORMATION   YES: ○

| | | |
|---|---|---|
| OVERPASS/ UNDERPASS DATA | OVERPASS | |
| | ALONGSIDE OVERPASS | |
| | UNDERPASS | ○ |
| | ALONGSIDE UNDERPASS | |
| NUMBER OF LANES | THREE OR MORE LANES | |
| | 2 LANES | ○ |
| | 1 LANE | |
| | NO CENTER LANE | |

FIG.3(A)

ROAD-NAME DATA

| ROAD CLASSIFICATION | CLASSIFICATION NO. |
|---|---|

| | | |
|---|---|---|
| MAIN EXPRESSWAY | MAIN ROAD | 1 |
| | ANCILLARY | 2 |
| MUNICIPAL EXPRESSWAY | MAIN ROAD | 3 |
| | ANCILLARY | 4 |
| TOLL | MAIN ROAD | 5 |
| | ANCILLARY | 6 |
| GENERAL ROADS { | NATIONAL ROAD | 7 |
| | PREFECTURAL ROAD | 8 |
| | MISCELLANEOUS | 9 |

FIG.3(B)

PRECAUTION DATA

| RAILROAD CROSSING | O |
|---|---|
| TUNNEL ENTRANCE | |
| TUNNEL EXIT | |
| POINT OF REDUCED WIDTH | |
| NONE | |

FIG.4(A)

TRAVEL GUIDANCE DATA

| BEAR RIGHT | |
|---|---|
| BEAR LEFT | |
| BEAR TOWARDS CENTER | O |
| NONE | |

FIG.4(B)

```
┌─────────────────────────────────────────────────┐
│  ┌───────────────────────────────────────────┐  │
│  │ DISPLAY INFORMATION                       │  │
│  └───────────────────────────────────────────┘  │
│  INFORMATION │RETURN│DESTI- │TRANSIT│MEMORY     │
│              │      │NATION │POINT  │           │
│  ┌───────────────────────────────────────────┐  │
│  │ NAME    AIUE CO., LTD.                    │  │
│  │ TELEPHONE NUMBER   03-3834-xxxx           │  │
│  │ ADDRESS  NO. 203 TOKYO BUILDING △-O,      │  │
│  │          UENO 1-CHOME, TAITO-KU, TOKYO    │  │
│  │                                           │  │
│  └───────────────────────────────────────────┘  │
└─────────────────────────────────────────────────┘
```

FIG.24

```
┌─────────────────────────────────────────────────┐
│  ┌───────────────────────────────────────────┐  │
│  │  RETRIEVE SURROUNDING INFORMATION         │  │
│  └───────────────────────────────────────────┘  │
│  ┌───────────────────────────────────────────┐  │
│  │  SURROUNDING INFORMATION GENRE LIST       │  │
│  ├───────────────────────────────────────────┤  │
│  │  PRODUCTION AND SALE OF FIBER & TEXTILE   │  │
│  ├───────────────────────────────────────────┤  │
│  │  DYEING AND DESIGN OF FIBER & TEXTILE     │  │
│  ├───────────────────────────────────────────┤  │
│  │  CLOTHING, FABRICS FOR KIMONO, ACCESSORIES│  │
│  ├───────────────────────────────────────────┤  │
│  │  OTHER PRODUCTS                           │  │
│  ├───────────────────────────────────────────┤  │
│  │  DAILY NECESSARIES, MISCELLANIOUS GOODS   │  │
│  │  STATIONARY, TOYS                         │  │
│  ├───────────────────────────────────────────┤  │
│  │  DECORATIONS, ORNAMENTS, FOLKCRAFT        │  │
│  ├───────────────────────────────────────────┤  │
│  │  LEATHER GOODS, ETC.                      │  │
│  ├───────────────────────────────────────────┤  │
│  │  FARMING, GARDENING                       │  │
│  └───────────────────────────────────────────┘  │
└─────────────────────────────────────────────────┘
```

FIG.25

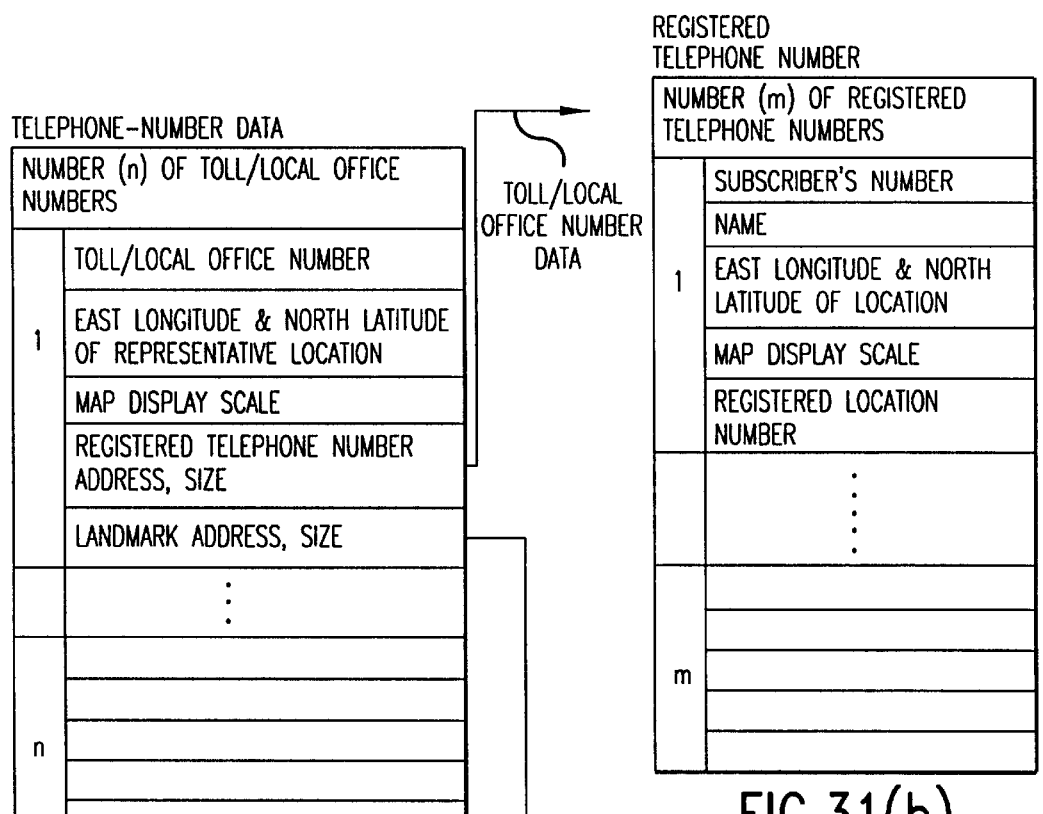
FIG.31(a)
FIG.31(b)
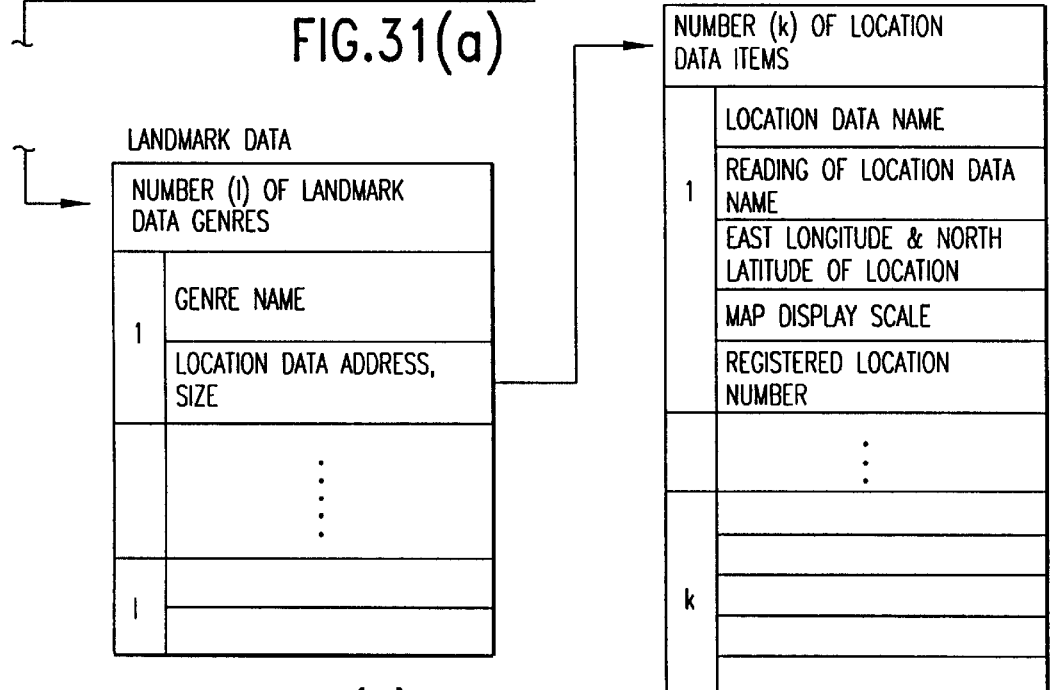
FIG.31(c)
FIG.31(d)

| REGISTERED LOCATION CLASSIFICATION | | NUMBER IN CLASSIFICATION |
|---|---|---|
| GENERALLY REGISTERED LOCATION | | |
| CLASSIFIED TELEPHONE DIRECTORY | ○ | |

NAVIGATION SYSTEM FOR DISPLAYING A STRUCTURE-SHAPE MAP

BACKGROUND OF THE INVENTION

This invention relates to a navigation system for providing road guidance by displaying a structure-shape map showing building shapes and roads, and also to a recording medium for such a navigation system. More particularly, the present invention relates to a navigation system using a structure-shape map on which shapes of structures are displayed by coordinates strings in different display modes varying in color or other display form, together with names of the structures, to retrieve information belonging to a structure concerned and to give guidance.

A navigation system for vehicles searches, upon input of a destination or the like, for a route from a present position or a designated departing location to the destination, and provides route guidance based upon the found route. One type of guidance screen used to provide route guidance using a screen or voice based upon a suggested route found as described above is such that a map showing surroundings of the present position is displayed, and a present-location mark is displayed on the map. To enter a location or give route guidance, a map is used. Therefore, in a case where a location such as a present position or a destination is set, or the user desires to see the location of a destination on a map, a wide-area map is displayed by entering a place name such as the name of a prefecture or a city, as described above, and then maps are successively changed over from such a wide-area map to a detailed map by utilizing the map display scale, thereby displaying a desired map. Alternatively, by entering a telephone number, a map centered on the registered location is displayed.

However, to recognize information ahead of a road on which the vehicle is traveling and select a road to be taken by using a displayed map as a lead, if a large amount of information is displayed on the map, necessary information may be buried in the other information, making it difficult to precisely recognize necessary information and decide a road to be taken. In particular, in the case of a structure-shape map as described later, shapes of buildings and general houses are displayed in addition to information regarding roads. Therefore, the amount of information on the map is too large for the driver to select necessary information by looking at the map while driving. Further, it takes an exceedingly long time to draw a map containing a large amount of information. Furthermore, when the screen scroll speed is high, the drawing processing cannot be completed in time for the scrolling operation, making it impossible to make a check on a map.

In a case where a map is displayed and various guidance is given thereon, a name of a place and names of structures such as buildings, facilities and so forth are displayed as minimum and necessary information, together with the map. To display such a place name and structure names, display coordinates and display areas must be prepared in advance as data for name display separately from map data. Therefore, the conventional practice is to store name data in addition to map data.

With the conventional method in which data for map display and data for name display are prepared, however, the amount of data is unfavorably large. Moreover, a system wherein maps are displayed by changing scales needs to store data for name display for each display scale. Therefore, the amount of data increases considerably, making it necessary to use a memory of large storage capacity.

In a case where a district name and structure names are displayed on a map, it is necessary to restrict the display of names such that no names overlap each other, and the visibility of the map is not impaired. On the other hand, in an urban area congested with buildings, for example, a large number of tenants occupy one building. Therefore, to investigate such a tenant-occupied building, if there is no information regarding tenants occupying each building, it is impossible to find or verify a building where a tenant concerned resides. There has heretofore been no system capable of retrieving and showing detailed information belonging to such buildings to give guidance.

In use of a navigation system for vehicles, there are cases where the user wants to ascertain where a location such as a destination or an en-route location is as well as sets such a location. In such a case, the conventional practice is to select and enter a prefecture name, a city name, a code, a menu, coordinates, etc. to thereby display maps successively. To designate a changeover of maps from a wide-area map to a detailed map also, a plurality of key operations must be conducted. Therefore, the operation for reading out a desired detailed map is complicated and troublesome. With the method whereby, upon input of a telephone number, a map centered on the relevant location is displayed, a desired detailed map can be displayed simply by entering a telephone number, but further information cannot be acquired.

That is, although a detailed map can be displayed by entering a telephone number, if there are a plurality of items of detailed information as in the case of a complex building at the displayed location, it is impossible to ascertain whether or not the desired information is one of them. Moreover, it is impossible to acquire information regarding features and shapes of buildings, facilities and so forth which may exist at the desired location and its vicinities. For example, in a urban area congested with buildings, a large number of tenants occupy one building. Therefore, to investigate such a tenant-occupied building, if there is no information regarding tenants occupying each building, it is impossible to find or verify a building where a tenant concerned resides. There has heretofore been only map information used mainly for the purpose of providing approximate information, and there has been nothing that enables retrieval or verification of such information as information regarding complex buildings as described above and multi-purpose facilities occupied by various residents.

SUMMARY OF THE INVENTION

An object of the present invention is to display information necessary for travel in a readily perceivable manner according to the travel condition and to enable necessary information to be provided without making the screen difficult to see even during scrolling. Another object of the present invention is to enable shapes and features of structures to be displayed in a readily perceivable manner to show information regarding structures for guidance, and to display structure names together with a map without increasing the storage capacity required, thereby providing a display screen of excellent visibility. A further object of the present invention is to make it possible to display, upon input of a telephone number, a structure-shape map having detailed information regarding a location represented by the entered telephone number.

In order to attain the foregoing objects, the present invention provides a navigation system for providing road guidance by displaying a structure-shape map showing building shapes and roads, the navigation system including storage means for storing guidance information including information regarding building shapes; display means for displaying the guidance information; and guidance control means for controlling information displayed on the display means; wherein the guidance control means sorts the information regarding building shapes stored in the storage means according to a predetermined condition, and controls information displayed on the display means on the basis of the sorted information regarding building shapes.

In addition, the present invention provides a navigation system which includes present-position sensing means for sensing a present position; storage means for storing guidance information including information regarding building shapes; condition judging means for judging whether or not a predetermined condition is satisfied; display means for displaying information regarding surroundings of the present position on the basis of the present position sensed by the present-position sensing means and the guidance information stored in the storage means; and guidance control means for controlling information displayed on the display means; wherein the guidance control means has sorting means for sorting building shapes from the information regarding building shapes stored in the storage means, so that the information regarding building shapes is sorted on the basis of a result of judgment by the condition judging means, and information displayed on the display means is controlled on the basis of the information regarding building shapes sorted by the sorting means.

In addition, the present invention provides a navigation system for providing road guidance by displaying a structure-shape map showing building shapes and roads, the navigation system including recording-medium read means for reading out, from a recording medium, a program and data for drawing building shapes and roads on the structure-shape map and displaying the structure-shape map to provide road guidance; non-volatile recording means for storing a program; program read means for reading the program read out by the recording-medium read means into the non-volatile recording means; display means for displaying the structure-shape map; and processing means for executing the program read into the non-volatile recording means by the program read means, thereby displaying the structure-shape map on the display means on the basis of the data recorded on the recording medium, which is read out through the recording-medium read means, to provide road guidance; wherein drawing of building shapes is restricted according to a specific condition when the structure-shape map is displayed on the display means.

In addition, the present invention provides a recording medium for a navigation system which provides road guidance by displaying a structure-shape map showing building shapes and roads, the recording medium having the record of structure-shape map data having information regarding shape of each of various structures, such as buildings, facilities and so forth, and information belonging to each of the structures; and a program for drawing and displaying a shape and name of each structure on the basis of the structure-shape map data and for restricting drawing of building shapes according to a specific condition.

In addition, the present invention provides a navigation system which includes input means for entering a telephone number; storage means for storing a set of position coordinates corresponding to each telephone subscriber's number, a set of representative position coordinates corresponding to an office number, and map data having information regarding shape of each of various structures, such as buildings, facilities and so forth, and information belonging to each of the structures, including a telephone number thereof; display means for displaying a structure-shape map showing a shape and name of a structure on the basis of the information regarding shape in the map data stored in the storage means; and retrieval and guidance control means for retrieving a telephone number stored in the storage means on the basis of a telephone number entered by the input means and for displaying, on the display means, a structure-shape map centered on a structure having the retrieved telephone number.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 2(A)–2(E) are diagrams showing an example of the construction of road-guidance data and so forth.

FIGS. 3(A) and 3(B) are diagrams showing an example of the construction of road-attribute data and so forth.

FIGS. 4(A) and 4(B) are diagrams showing an example of the construction of precaution data and so forth.

FIG. 24 is a diagram showing an example of an information guidance screen using a structure-shape map.

FIG. 25 is a diagram showing a list display screen for retrieval of information regarding surroundings of a structure.

FIGS. 31(A)–31(D) are diagrams showing an example of the composition of a telephone-number data file.

DESCRIPTION OF PREFERRED EMBODIMENTS

Figure 1:
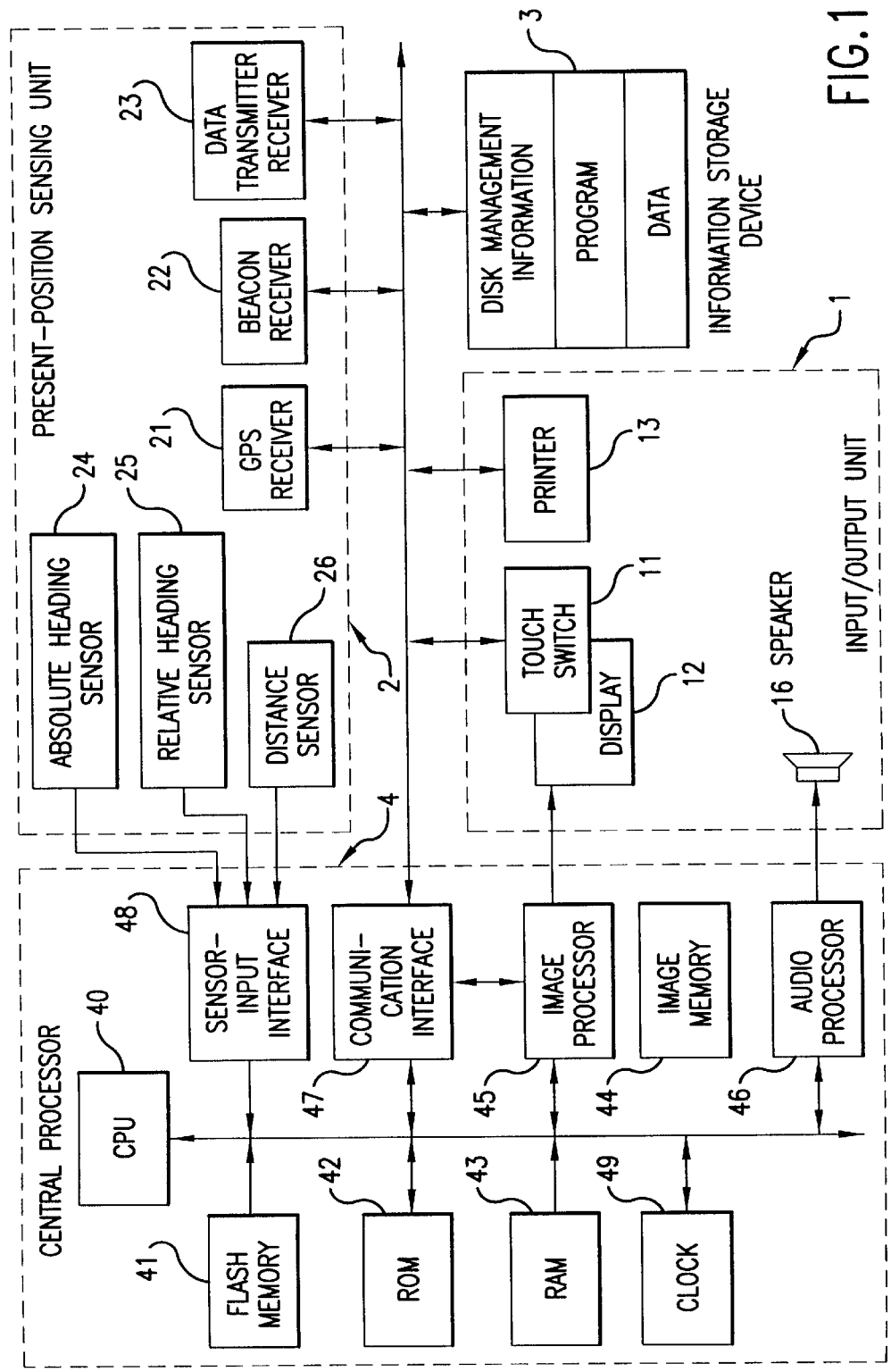
FIG. 1 is a diagram showing an embodiment of a navigation system using a structure-shape map according to the present invention.

FIG. 1 shows a navigation system using a structure-shape map according to the present invention. The navigation system comprises an input/output unit 1 for input/output of information relating to route guidance, a present-position sensing unit 2 for sensing information relating to the present position of a vehicle equipped with this navigation system, an information storage device 3 in which navigation data necessary for route calculation and display guidance data necessary for instructional guidance have been recorded, and a central processor 4 for executing route finding processing, display guidance processing necessary for route guidance, and control of the overall system. Each of these components will now be described.

The input/output unit 1 functions to enter destinations, to allow the driver to instruct the central processor 4, at the volition of the driver, to execute navigation processing in such a manner that guidance information can be outputted by voice and/or a screen display when required by the driver, and to print out processed data. As means for implementing these functions, the input section of the input/output unit 1 has a touch switch 11 and operation switch for entering a destination in the form of a telephone number or coordinates on a map, and for requesting route guidance. It is also possible to use a remote controller or other similar input device. The output section has a display 12 for displaying input data on a screen and, moreover, for automatically displaying route guidance on the screen in response to a request from the driver, a printer 13 for printing out data processed by the central processor 4 and data stored in the information storage device 3, and a speaker 16 for outputting route guidance by voice.

It is possible to add a voice recognition unit for enabling voice input and/or a record card reader for reading data recorded on an IC card or a magnetic card. It is also possible to add a data communication device for exchanging data between information sources such as an information center in which data necessary for navigation has been stored and which provides necessary data through a communication channel in response to a request from the driver, and an electronic notebook in which driver's own data, e.g. map data, destination data, etc., has previously been stored.

The display 12 is constituted by a color CRT or color liquid-crystal display device. On the basis of map data and guidance data processed by the central processor 4, the display 12 outputs, as a color display, all screens necessary for navigation, such as a route setting screen, a screen of an interval view and a screen of intersections. The display 12 also displays buttons for setting route guidance and for changing over guidance and screens during the route instruction. In particular, transit-intersection information such as the names of intersections to be traversed is displayed in color in the form of a pop-up menu on the interval view when required.

The display 12 is provided inside the instrument panel in the vicinity of the driver's seat. Observing displayed map enables the driver to ascertain the present location of the vehicle and to obtain information regarding a route from this location. The display 12 is provided with the touch panel 11 that corresponds to the display of function buttons. The operations described above are executed based upon signals entered by touching the buttons. Input signal generating means constituted by the buttons and touch panel constructs the input section, though a detailed description thereof is omitted.

The present-position sensing unit 2 has a GPS receiver 21 which utilizes a global positioning system (GPS), a beacon receiver 22, a data transceiver 23 for receiving a GPS correction signal utilizing a cellular phone or a FM multiplex signal, an absolute heading sensor 24 constituted by a geomagnetic sensor or the like, a relative heading sensor 25 constituted by a wheel sensor, steering sensor or gyro, etc., and a distance sensor 26 for sensing traveling distance from the number of revolutions of a wheel.

The information storage device 3 is an external storage device in which a program and data for navigation have been stored, for example, a CD-ROM. The program comprises an application section and an OS section. The application section includes a map drawing part, a route finding part, a route guidance part, a present-position calculating part, a destination setting operation control part, etc., and executes signal-output processing for navigation. The program part of the information storage device 3 stores programs for executing processing such as route finding processing, programs for executing display-output control necessary for route guidance and for executing voice output control necessary for voice guidance, and data necessary therefor, together with display information data necessary for route guidance and map display. The data part of the information storage device 3 stores all data necessary for the navigation system, the data comprising the files required for route guidance, such as map data (road map, residence map, structure-shape map, etc.), intersection data, node data, road data, photographic data, registered-location data, destination data, suggested-road data, detailed destination data, destination reading data, telephone-number data, address data, and other data.

The central processor 4 comprises a CPU 40 for executing various kinds of arithmetic processing; a flash memory 41 for storing a program read out of the CD-ROM of the information storage device 3; a ROM 42 in which are stored a program for executing program check for the flash memory 41 and a program for executing update processing (i.e. program read means); a RAM 43 for temporarily storing the location coordinates of a set destination, guidance information for a found route, such as the code number of a road, and data which is in the course of being processed; an image memory 44 in which image data used to display a screen on the display unit is stored; an image processor 45 which, on the basis of a display-output control signal from the CPU 40, extracts image data from the image memory 44 and delivers the data to the display unit upon subjecting it to image processing; an audio processor 46 which, on the basis of an audio-output control signal from the CPU, combines audio, phrases, single sentences and sounds read out of the information storage device 3, converts the result to an analog signal and delivers the analog signal to the speaker 16; a communication interface 47 for performing an exchange of input/output data by communication; a sensor-input interface 48 for accepting a sensor signal from the present-position sensing unit 2; and a clock 49 for entering date and time into internal dialog information. In the central processor 4, when the sensor-input interface 48 accepts data obtained by the various sensors in the present-position sensing unit 2, the CPU 40, on the basis of the data, calculates present-location coordinates every fixed period of time, and temporarily writes the calculated present-location coordinates onto the ROM 42. The present-location coordinates are determined by executing map matching processing taking into consideration errors in detection of various data. Output values obtained from the various sensors are corrected at all times. Route guidance is so adapted that the driver is capable of selecting either a screen display or voice output.

FIGS. 2(A) through 5(B) illustrate diagrams showing an example of the construction of principal data files stored in the information storage device. FIG. 2(A) shows a data file of a suggested road. The file comprises, for each of n-number of roads, a road number, length, road-attribute data, shape data address and size, and guidance data address and size. The suggested-road data is stored as data necessary for route guidance, which is obtained by route finding processing.

The road number is set by category of direction (outbound or inbound) for each road between branch points. The road-attribute data is data indicating road guidance auxiliary information. As shown in FIG. 3(A), the road-attribute data is composed of data indicating whether a road is an overpass, a road alongside an overpass, an underpass or a road alongside an underpass, and data indicating information regarding the number of lanes. As shown in FIG. 2(B), the shape data has coordinate data which, when each road is partitioned into a plurality of nodes, comprises east longitude and north latitude for each of m-number of nodes. As illustrated in FIG. 2(C), the guidance data comprises an intersection (or branch point) name, precaution data, road name data, address and size of road-name voice data, and address and size of destination data.

Of the guidance data, the precaution data is, as shown in FIG. 4(A), data indicating information relating to railroad crossings, tunnel entrances, tunnel exits, points of reduced road width, "none", etc. This data warns the driver about railroad crossings and tunnels, etc., in addition to branch points. As shown in FIG. 3(B), the road name data is data indicating information of road category, such as expressway, municipal expressway, toll road and general road (national road, prefectural road, etc.), and information indicating whether a road is the main road or ancillary road of an expressway, municipal expressway or toll road. This data is composed of road classification data and classification numbers, namely individual number data for each road classification. As shown in FIG. 2(D), the destination data comprises destination road number, destination name, the address and size of destination-name voice data, destination direction data and travel guidance data.

Of the destination data, the destination direction data is data indicating information representing invalidity (meaning that the destination direction data is not used), disuse (guidance is not given), straight ahead, right direction, diagonally right direction, direction returning to right, left direction, diagonally left direction and direction returning to left. As shown in FIG. 4(B), the travel guidance data stores data for instructing the driver which lane to take when there are a plurality of lanes. The data indicates information instructing the driver to bear right, bear left, bear towards the center or "none".

Figure 5A:
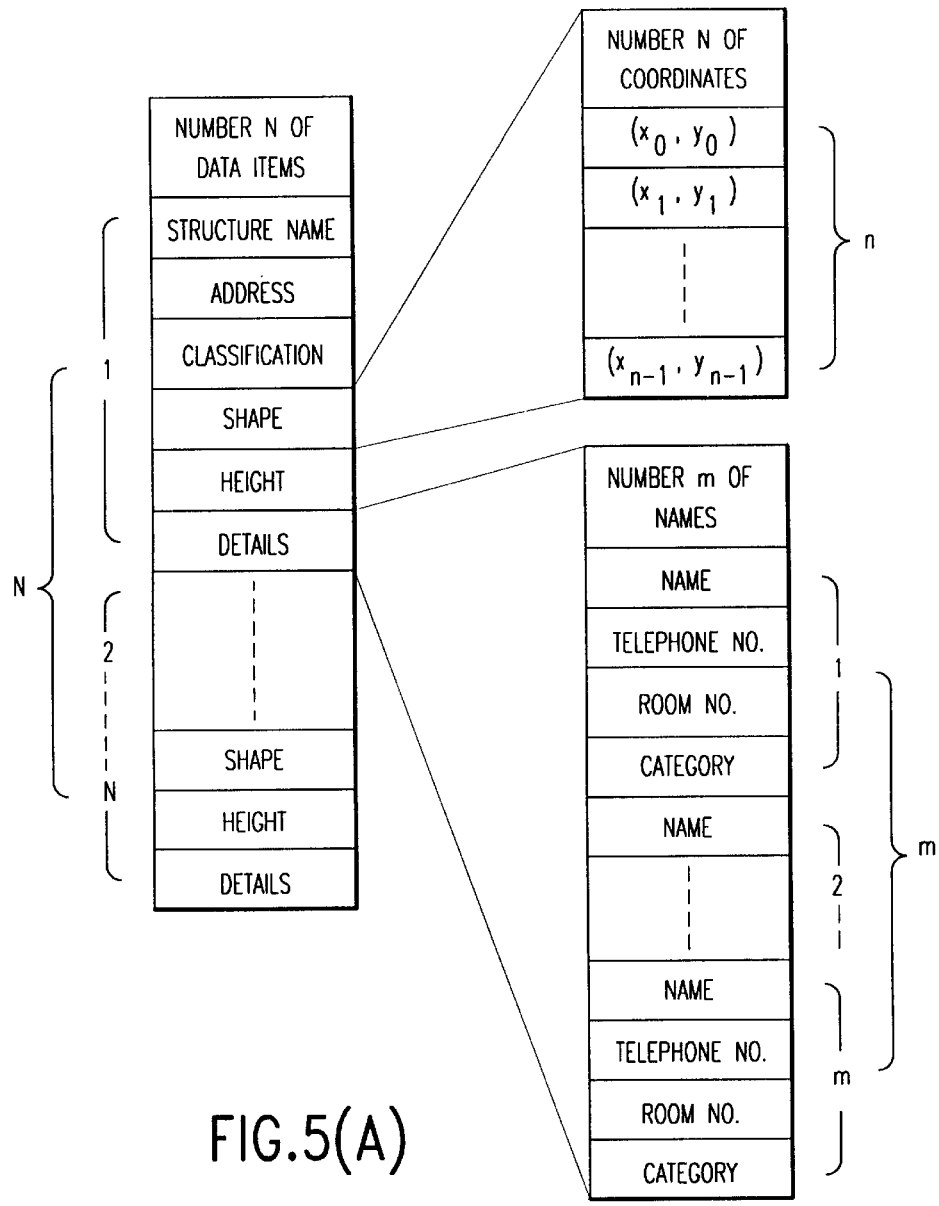
FIGS. 5(A) and 5(B) are diagrams showing an example of the construction of data for a structure-shape map.
Figure 5B:
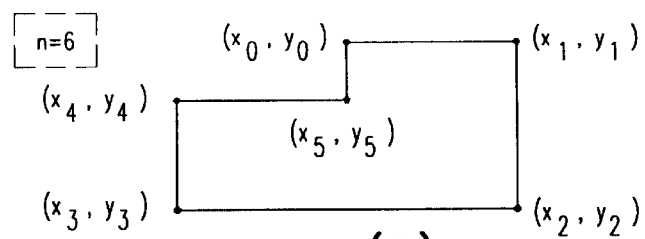

As shown for example in FIG. 5(A), data for a structure-shape map comprises the number of data items (N), i.e. the number of data items relating to structures such as buildings, bridges, towers, parks, athletic fields, roads, etc. Next to the number of data items (N), data regarding each of the N-number of structures is stored. Data regarding each structure comprises structure name, address, classification, structure shape, height and details. Regarding the structure name, if a structure is a building, the name of the building is stored. In the case of an individual's house, the resident's name is stored. For a facility, its name is stored. In the case of a road, the name of a road classification or a street's name, such as "Central Street" or "National Highway No. 1", is stored. The address is the address of the structure concerned. The structure shape is data comprising the number of coordinates (n) representing a shape and coordinate values $(x_0,y_0)$, $(x_1,y_1)$, . . . , $(x_{n-1},y_{n-1})$. The classification is information indicating structure categories, such as general houses, apartment houses, office buildings, public facilities, roads, parks, etc. The height is information indicating the number of stories or height (meters). The details are information regarding each tenant in the case of a tenant-occupied building, for example. The details comprise the number of names (m) and information regarding name, telephone number, room number, category (according to type or nature of business, e.g. a family restaurant, a convenience store, etc.). Accordingly, as shown in FIG. 5(B), coordinate values are sequentially read out as information regarding a shape of a structure, and points defined by the coordinate values are connected by straight lines to draw and display a figure, thereby making it possible to output shapes of various kinds of structure, e.g. planar shapes of buildings and houses, topographic features of parks, etc. Roads can also be handled as data having a shape. Data relating to road signs, i.e. "No entry", "One-way traffic", etc., names of streets, and names of blocks as names of areas, may be constructed as data items independent of each other or as data attached to each road. In this case, marks of "No entry", "One-way traffic", etc., for example, have respective coordinate values and angles for displaying them. The same is the case with street names and block names.

Next, the operation will be described.

Figure 6:
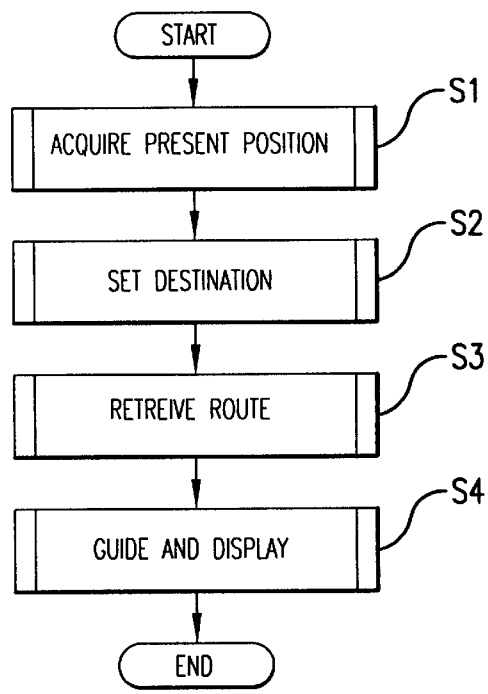
FIG. 6 is a flowchart for describing the flow of processing of the overall navigation system for vehicles according to the present invention.

Referring to FIG. 6, when the program of the route guidance system is started by the CPU 40 of the central processor 4, first the present position is sensed by the present-position sensing unit 2, a map of surroundings centered on the present position is displayed, and the name of the present position is displayed (step S1). Next, the destination is set (step S2) using a telephone number and an address, facility name and registered location, etc., after which a route from the present position to the destination is found (step S3). When the route has been decided, route guidance and display are performed repeatedly (step S4), until the destination is reached, while the present position is followed up by the present-position sensing unit 2. If there is entry of en-route setting before the destination is reached, a search area is set, and re-search is executed in the set search area. In this way, route guidance is similarly performed repeatedly until the destination is reached.

The system has means for judging a predetermined condition, and means for changing over maps from one to another when the predetermined condition is satisfied. Therefore, maps can be changed at a desired timing by a user's manual operation. Accordingly, during travel on a route decided, a road map is displayed, and if there is an en-route location desired to be traversed, detailed information regarding surroundings of the desired facility can be provided speedily by performing a map changing operation. Thus, the driver can obtain various information indicative of the position of the desired facility, the location of a parking lot, or one-way roads around the desired location, and reach the destination without fail.

In the above-described processing, a road map and a structure-shape map are displayed according to need at each of the steps of inputting, verifying and setting locations such as present position and destination, verifying a found route and providing route guidance. Next, the processing for displaying a structure-shape map using the data described in connection with FIGS. 5(A) and 5(B) will be described.

Figure 7:
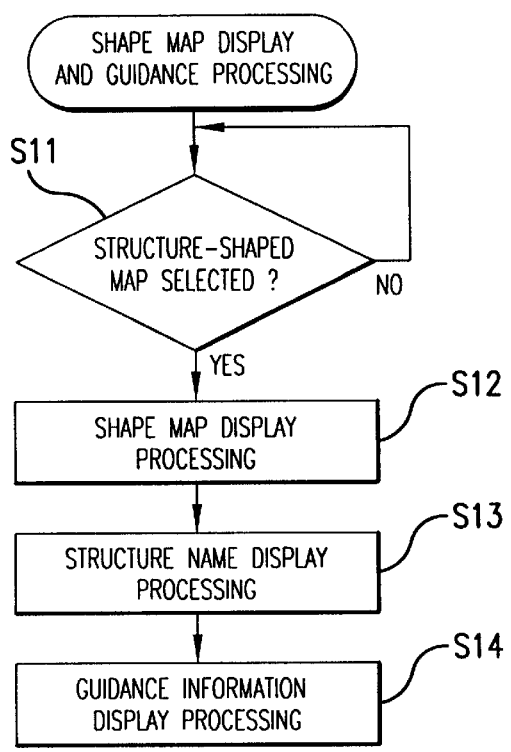
FIG. 7 is a flowchart for describing the processing for displaying a structure-shape map.

Referring to FIG. 7, when a structure-shape map is selected (step S11) in the map display mode, for example, first display processing for a shape map is executed (step S12), and processing for displaying a structure name on the shape map is executed (step 13). Then, a present position mark and guidance information are displayed (step S14). In the case of a general house or building or other building structure, its planar shape is displayed as structure shape. In the case of a park or a road, its planar topography is displayed. Accordingly, in the case of a building containing a large number of residents, there is information regarding the residents of the building. Therefore, even a single structure shape may have a large amount of information. For this reason, in the shape map display processing at step S12 and in the structure name display processing at step S13, shapes of structures and public facilities which have a large amount of information are displayed in an easily recognizable form which is different from a display form for general houses. Moreover, for such structures and public facilities, their names are displayed with priority. Any overlapping names are not displayed. Furthermore, names of blocks and public facilities are given high priority. Thus, structure names are displayed in the following order: names of blocks, names of public facilities, and names of structures having a large amount information regarding their contents.

Figures 8A, 8B:
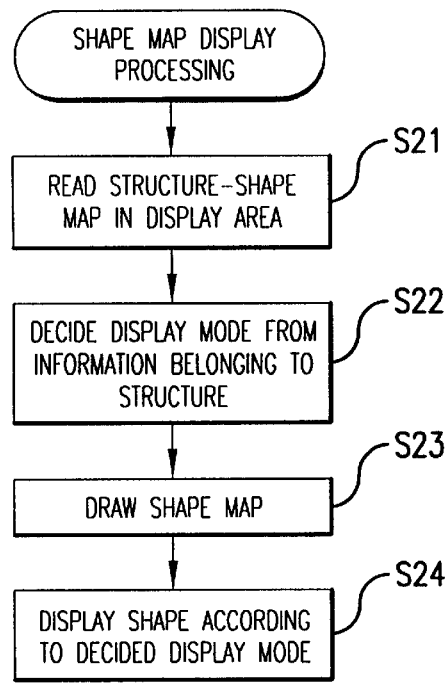
FIGS. 8(A)–8(C) are flowcharts for describing the processing for displaying structure shapes.

FIG. 8(A) shows the processing for displaying structure shapes. Data regarding a structure-shape map for a display area is retrieved and read out of the information storage device 3 (step S21), and a display mode for the shape of each structure to be displayed are decided (step S22). The display mode includes colors of shapes to be displayed, color densities, and patterns thereof, as has been described above. A suitable display mode is decided according to the classification, height, and scale of construction. For example, structures can be distinguished by classification, i.e. public facilities, railroad stations, theaters, art museums, amusement parks, towers, apartment houses, and buildings other than general houses. Further, public facilities can be distinguished from each other accordingly to whether they are public institutions such as public offices, police stations, and public halls, or public facilities such as parks and athletic fields. Buildings other than general houses can be distinguished from each other by height (number of stories), the number of tenants, etc. After a display mode has been decided in this way, a structure-shape map is displayed (step S23), and each shape is displayed by processing the area within it according to the decided display mode (step S24).

If a display mode decision table such as that shown in FIG. 8(B) is registered in advance, a display mode can be decided at step S22 by referring to data regarding a structure-shape map to be displayed and the display mode decision table. The display mode decision table shown in FIG. 8(B) is an example in which display modes such as colors, color densities, and patterns thereof are set in correspondence to the classification, height, and scale of construction. That is, in a case where a structure to be displayed is a public facility, color a is used, while color d is used for a suggested road. In a case where a structure to be displayed is neither a public facility nor a road and there is detailed information, color b is used with the color density changed according to the scale of construction of the structure. In a case where the height of the structure is more than a predetermined value, the shape is displayed in a mesh pattern of color c. Accordingly, in a case where the display mode decision table is used, the following processing is executed at step S22.

Figure 8C:
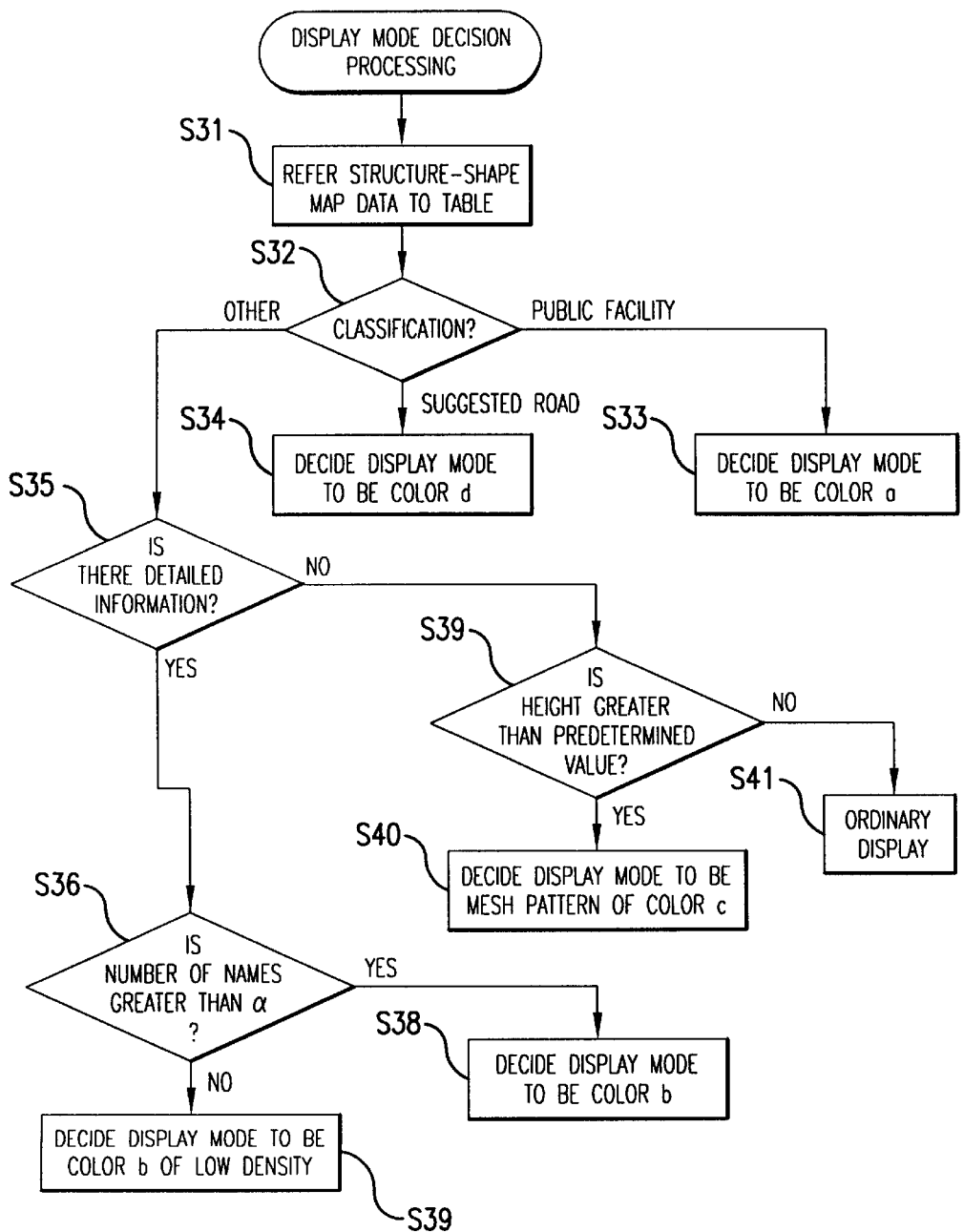

First, as shown in FIG. 8(C), each item of structure-shape map data is referred to the display mode decision table (step S31), and it is first judged by classification whether the structure concerned is a public facility or a road or neither of them (step S32). If the structure is a public facility, the display mode is decided to be color a (step S33). If the structure is a road and it is on a suggested route decided by route finding (i.e. a suggested road), the display mode is decided to be color d (step S34). Because a route already found has suggested-road data as has been described in connected with FIGS. 2(A)–2(E), a suggested route is drawn over the map with a width corresponding to the number of lanes based upon the suggested-road data. If the structure concerned is neither a public facility nor a road, then it is checked whether or not there is detailed information (step S35). If there is detailed information, then it is judged whether the number of names in the information is equal to or greater than $\alpha$ (step S36). If the number of names is equal to or greater than $\alpha$, the display mode is decided to be light color b (step S37). Even when there is no detailed information, further the height of the structure is checked (step S39). If the height is greater than a predetermined value, the display mode is decided to be mesh pattern of color c (step S40). In this example, whether the structure concerned is a public facility or not is given top priority when the display mode is decided. Next, priority is given to detailed information, that is, the scale of construction of the structure. Finally, the display mode is decided by height.

Figure 9:
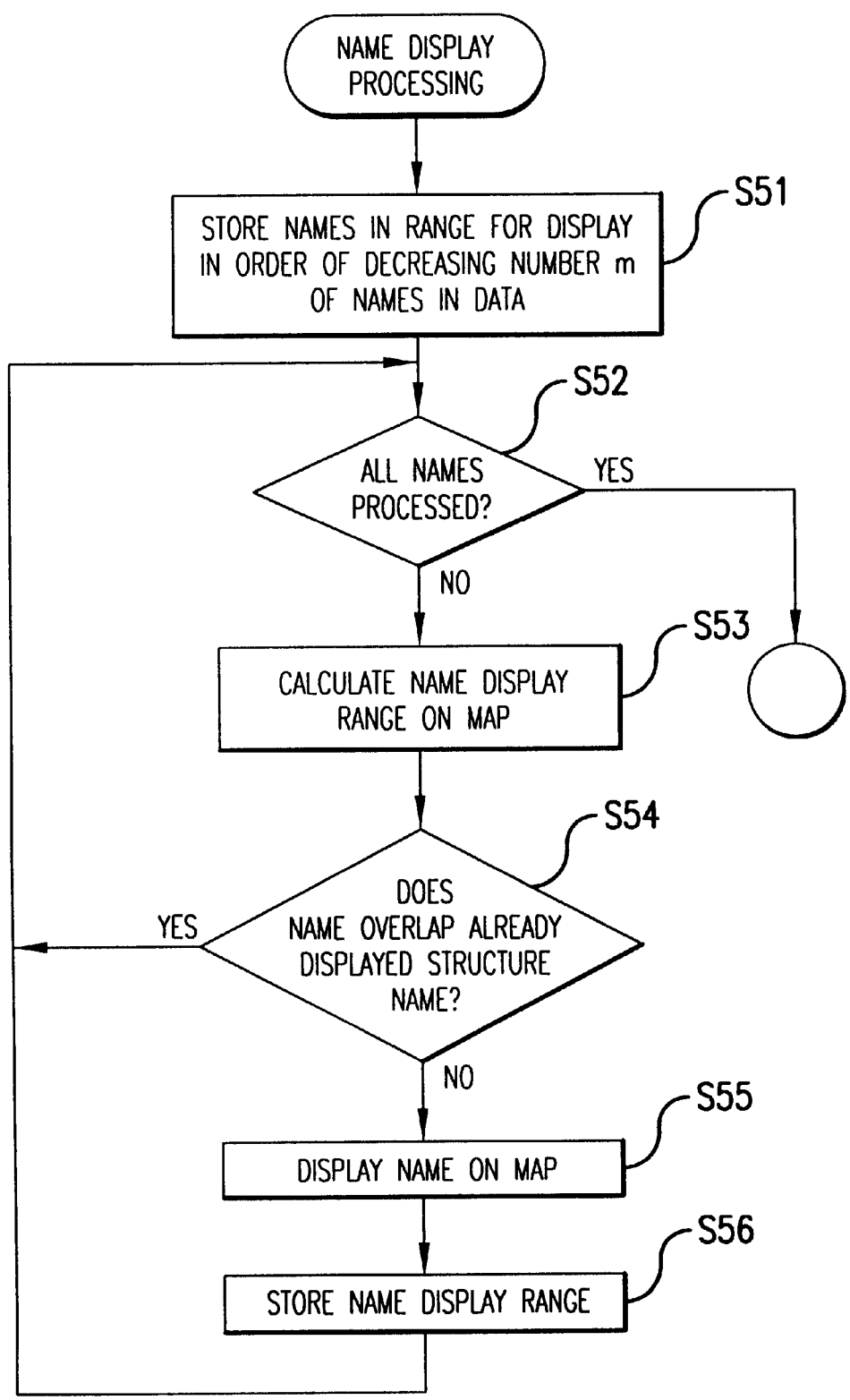
FIG. 9 is a flowchart for describing the processing for displaying structure names.

Names displayed over displayed structures vary in length, and because of the display screen size and display area, all names cannot be displayed. Therefore, names are prioritized according to classification and amount of detailed information, for example, in the same way as in the case of decision of a display mode as described above, and a display of names is restricted within a range in which displayed names do not overlap each other. FIG. 9 shows an example of processing therefor. First, from among data within the range for display, names are stored in order of decreasing number of names (m) in the detailed information (step S51). After all names have been processed (step S52), a display range on the map is calculated for each of the names in order of decreasing number of names (m) (step S53), and names which will not overlap any of the display ranges of names already displayed (step S54) are displayed on the map (step S55). Then, the display ranges of the names are stored (step S56), and the program returns to step S52 to repeat the same processing.

Name display ranges are each determined by distributing an area for display to both sides from the center of a structure according to the number of characters based upon the length and breadth of each character and character spacing. Each name display range is stored in the form of coordinates of the upper left and lower right positions of a string of characters. If whether or not name display ranges overlap is judged by only the length and breadth of each character and the character spacing, names which are adjacent to each other at a slight spacing may be displayed all over the display screen, making the map difficult to see. Therefore, it may be judged that display ranges do not overlap when the names are spaced apart from each other more than a predetermined distance. This may be realized, for example, by a method whereby a display range is determined by providing a margin which is $\alpha$ times the character size at each of the upper and lower sides of a character string and also providing a margin which is $\beta$ times the character size at each of the left and right ends of the character string, or by setting as a margin a predetermined number of characters at each of the four sides (upper, lower, right and left) of a character string. Names include not only character strings but also marks generally used on maps as indications of schools, hospitals, post offices, etc. together with service marks and other various character marks and patterns.

Thus, it is possible with the structure-shape map data according to the present invention to determine by calculation a center coordinate and coordinates of a range for displaying a name from a coordinate string representing a shape. Accordingly, a name of data on the structure-shape map can be displayed in a display range, calculated from the coordinate string, over another map stored in the information storage device together with the structure-shape map. In this case, processing for displaying a map and processing for displaying a name can be executed independently of each other, and if the display coordinates of the map and those of the name are made to match each other, the map and the name can be displayed without any displacement. Such combination of processing operations enables the shape coordinate strings and names in the structure-shape map data to be mutually used for another map as data for name display. Thus, the amount of data can be reduced to a considerable extent.

Figure 10A:
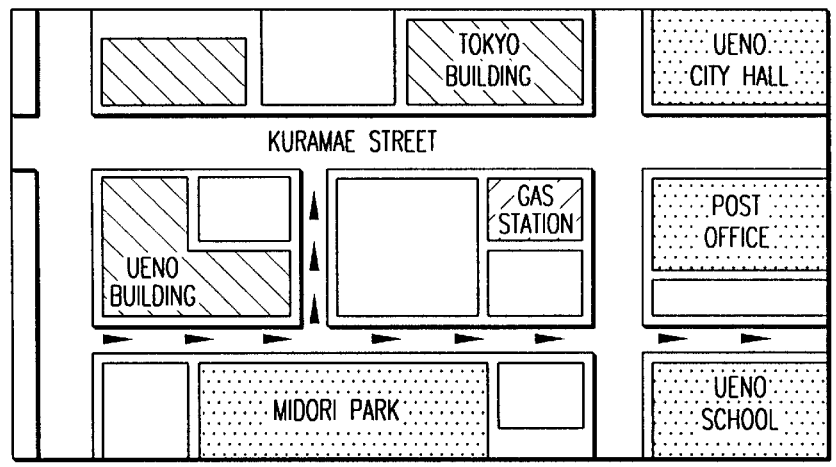
FIGS. 10(A)–10(C) are diagrams showing a display example of a structure-shape map.
Figure 10B:
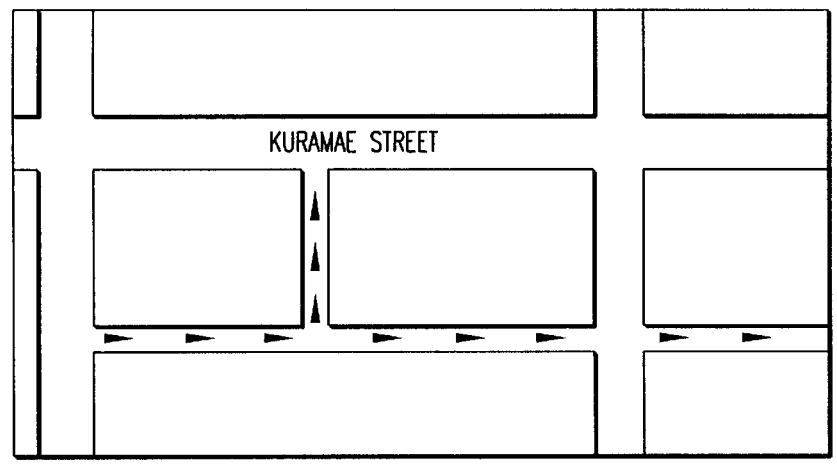
Figure 10C:
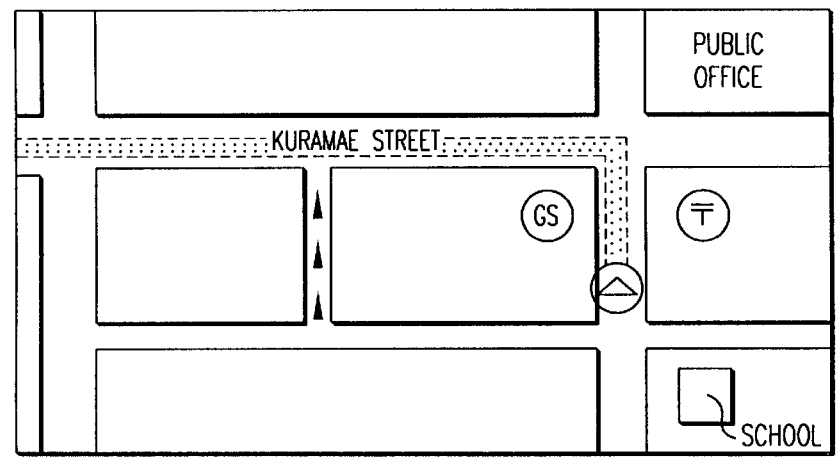

FIGS. 10(A)–10(C) show display examples of a structure-shape map. FIG. 10(A) shows a display example of a structure-shape map when the vehicle is at rest. FIG. 10(B) shows a display example of a structure-shape map from which information other than information relating to roads has been deleted. FIG. 10(C) shows an example in which various displays, i.e. a route display, a present location mark display, a landmark display at a suggested intersection, and a one-way traffic mark display, are incorporated into a structure-shape map from which information other than information relating to roads has been deleted. In FIG. 10(A), names of park, public facilities and street are also displayed as names of structures, and some structures which are shown by different patterns are displayed in different display modes. In the case of color display, a distinguishable display can be performed by combining colors, color densities and patterns thereof. Therefore, the display modes are changed according to data classification information, height information, the number of names in the detailed information, etc. For example, structures which can be generally recognized as target objects in common, such as public facilities, e.g. schools, city halls, post offices and railroad stations, and parks, together with tenant-occupied buildings which are large in the number of names (m), are displayed in a display mode different from the ordinary display mode, thereby making it possible to readily perceive features of target objects in the district displayed as a map. FIG. 10(B) shows an example in which a structure-shape map is displayed with the drawing of building shape restricted. FIG. 10(C) shows an example in which a highlight display of information relating to roads, such as one-way traffic marks, together with a route display and a landmark display, is performed on the structure-shape map shown in FIG. 10(B). These will be described later more specifically.

The foregoing processing is executed when a structure-shape map is displayed in the ordinary mode. When a structure-shape map is displayed for route guidance during travel of the vehicle, however, if the amount of information on the map is large, information necessary for travel may be buried in other information. In particular, when the vehicle is traveling at a speed higher than a certain level, it is difficult to recognize information by looking at a map displayed on the screen during travel. Therefore, when a structure-shape map is displayed on the guidance screen, it is also necessary to display it in such a manner that the driver can recognize guidance information almost instantaneously at a glance. The following is a description of an example of such a display.

Figure 11A:
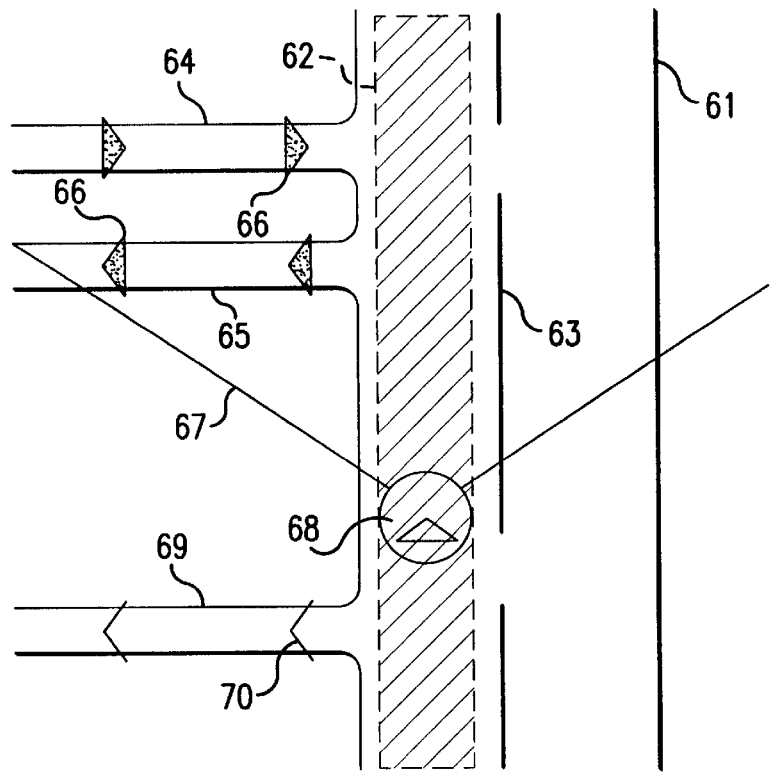
FIGS. 11(A) and 11(B) are diagrams showing an example of a guidance screen using a structure-shape map.
Figure 11B:
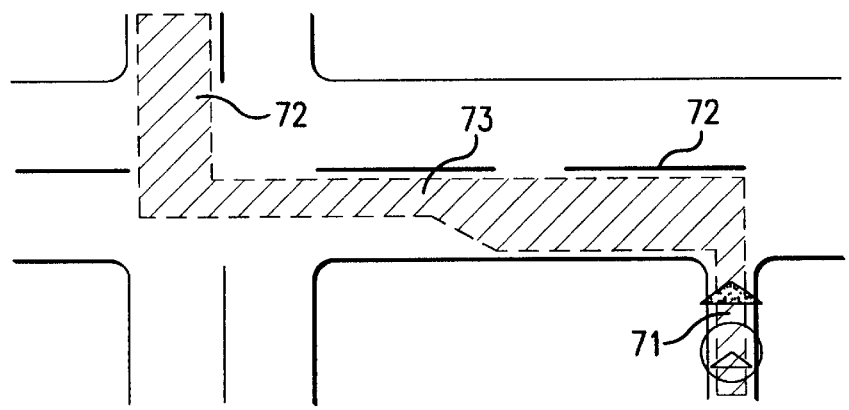

In FIGS. 11(A) and 11(B), reference numeral 61 denotes a road, 62 a suggested route, 63 a center line, 64, 65 and 69 one-way roads, 66 and 70 one-way traffic marks, 67 a search range line, and 68 a present location mark.

When a structure-shape map is displayed on the guidance screen during travel, basically a road 61, one-way roads 64, 65 and 69, and a present location mark 68, which indicates the present position on the road, are displayed, as shown in FIG. 11(A). Further, as information relating to roads, information necessary for travel, such as one-way traffic marks 66, railroad crossings, pedestrian crossing, and readily recognizable landmarks lying along the road, are displayed in a readily perceivable form (highlight display) according to the travel conditions. In this case, only necessary information relating to roads around the present location is highlighted, which information may be information relating to roads within a predetermined radius of the present location, information relating to roads along the direction of travel from the present location, information relating to roads within a predetermined angular range in the direction of travel, or information relating to roads within a predetermined distance range in the direction of travel. The angular and distance ranges may be varied according to the vehicle speed such that when the vehicle is traveling at high speed, information relating roads relatively far ahead is highlighted, whereas, when the vehicle is traveling at low speed, information relating to roads relatively near ahead is highlighted. Moreover, information relating to a calculated suggested route may be retrieved from the storage means and highlighted. It should be noted that information relating to the suggested route is, for example, information relating to roads connecting to roads on the suggested route, or information relating to roads around roads on the suggested route. Among these items of information, the search range line 67 sets a range at a predetermined angle, e.g. ±60°, ahead of the present location mark 68 to retrieve information to be highlighted. For example, the one-way traffic marks 66 are retrieved in this range and highlighted. The one-way traffic marks 70 are displayed in the ordinary mode because they are outside the search range. Before the present location mark 68 reaches the position illustrated in the figure, that is, when the present location mark 68 is short of a one-way road 69 below the position of the present location mark 68 as shown in the figure, then one-way traffic marks 70 are also highlighted. After the location of the one-way road 69 has been passed, the highlight display is changed over to the ordinary display. Accordingly, in the structure-shape map shown in FIG. 10(A), information unnecessary for travel, such as building shapes, are drawn in the same color as the background color or not drawn, thereby not being substantially displayed as shown in FIG. 10(B). The suggested route 62 is drawn with a predetermined width based upon the coordinate values and the number of lanes from the suggested-road data. To search for highlighted landmarks or the like from the position of the present location mark 68, an angular range is set for a certain direction of travel as described above. However, a search range may be set with a predetermined distance for each side ahead of the present location mark 68 on the basis of the suggested route 62. FIG. 10(C) shows an example in which, as shown in FIG. 10(B), the display of building shapes is deleted from the structure-shape map shown in FIG. 10(A), but the present location mark and the route are displayed instead, and in which one-way traffic marks are highlighted as information relating to roads along the route, and moreover, marks indicating a school, a post office and a gas station are displayed as landmarks.

Next, an example of display processing according to travel using a structure-shape map will be described.

Figure 12:
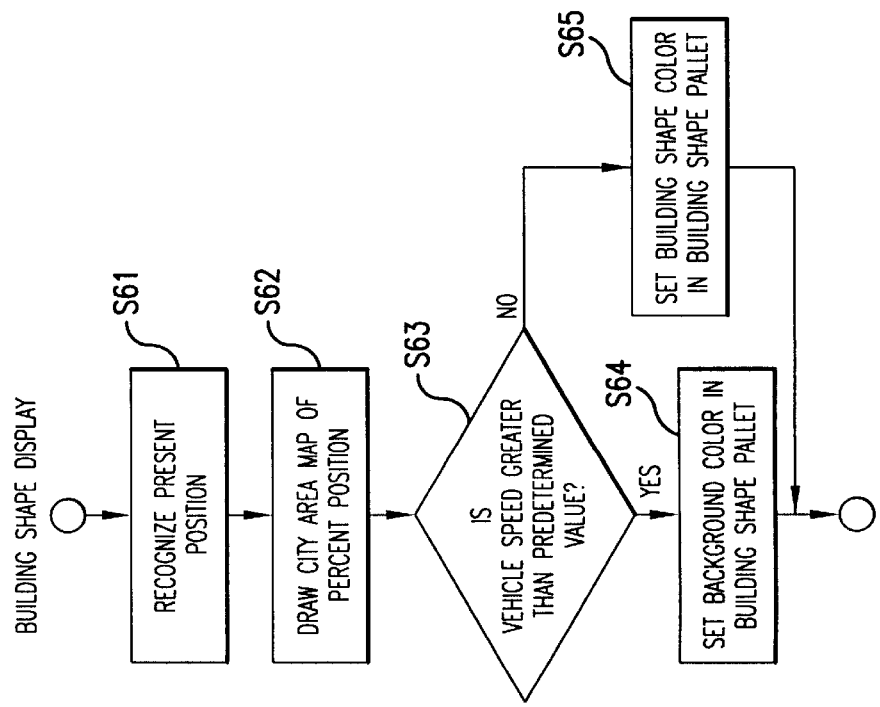
FIG. 12 is a flowchart for describing an example of the processing for displaying building shapes.

As a way of using a structure-shape map, for example, to find a location desired to be set as a destination from an area map displayed based upon information serving as a certain guide, it is desired to display rather detailed information. However, during travel, only information relating to roads should be highlighted. Conversely, a display of building shapes which are not related to roads, is unnecessary. Therefore, a display of building shapes is performed as follows. As shown in FIG. 12, the present location is recognized (step S61), and a structure-shape map around the present location is drawn (step S62). Then, it is judged whether or not the vehicle speed is greater than a predetermined value (step S63). If the vehicle speed is greater than the predetermined value, a background color is set in a pallet for building shapes (step S64), thereby displaying a structure-shape map as shown in FIG. 10(B), by way of example. If the vehicle speed is not greater than the predetermined value, building shape colors such as those shown in FIG. 8(B), by way of example, are set in the building shape pallet (step S65), thereby displaying a structure-shape map as shown in FIG. 10(A). In this processing, whether or not a building shape is related to a suggested road can be judged by the classification in the structure-shape map data, which has been described in connection with FIGS. 5(A) and 5(B). Accordingly, a special kind of building shape can be excluded from objects to be judged in this processing.

In a case where the pallet for displaying building shapes which are judged to be unnecessary to display during travel on the basis of a predetermined vehicle speed is changed to the same pallet as that for the background color as described above, the building shapes are not substantially displayed on the display screen, but the drawing processing therefor is the same as in a case where building shapes are actually displayed. If display contents when the vehicle is traveling at a speed greater than a predetermined speed and those when the vehicle is at rest or traveling at low speed are changed over by changing the pallets, the display processing at the boundary region of the predetermined vehicle speed can be executed speedily. The arrangement may be such that the display control means is provided with a means for judging a predetermined condition, and when it is judged that the predetermined condition is satisfied, information necessary for display is selected from the storage means, thereby subjecting only information necessary for display to drawing processing. With this arrangement, time required for drawing processing can be reduced. Therefore, it is possible to execute drawing processing rapidly even when drawing processing must be executed at high speed, for example, when the vehicle is traveling at high speed, or when the screen is scrolled. These processing operations may be changed over by a means for judging a predetermined condition.

Figure 13:
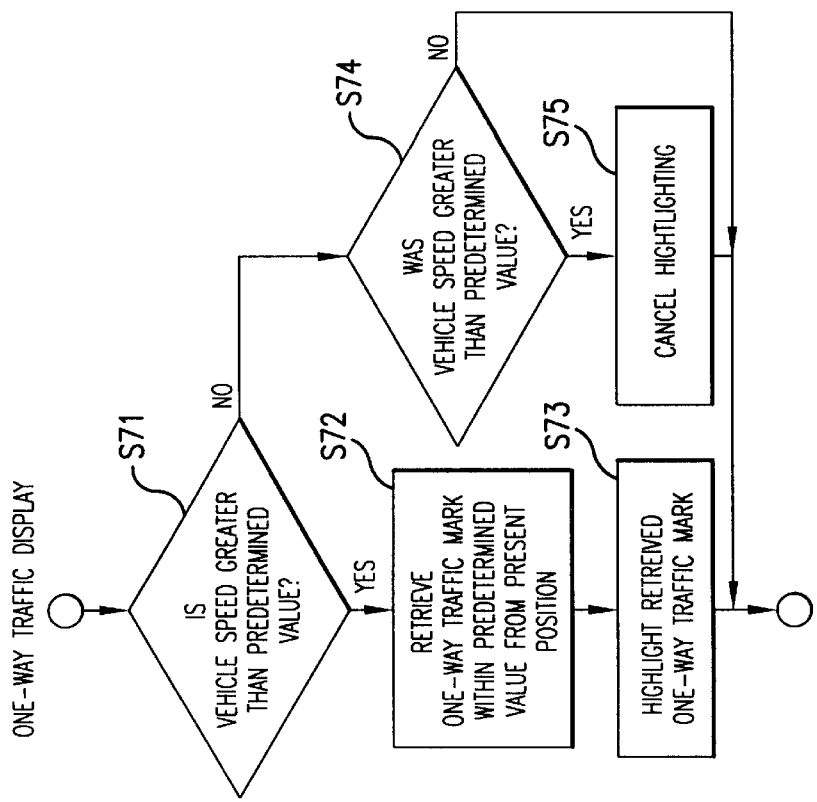
FIG. 13 is a flowchart for describing an example of the processing for displaying one-way traffic marks.

In contrast to building shapes, information relating to roads, such as one-way traffic marks, is stored and highlighted as necessary information in the forward direction during travel. In the one-way traffic mark display, as shown in FIG. 13, it is judged whether or not the vehicle speed is greater than predetermined value (step S71). If the vehicle speed is greater than the predetermined value, one-way traffic marks within a predetermined value from the present position are retrieved (step S72), and the retrieved one-way traffic marks are highlighted (step S73). However, if the vehicle speed is not greater than the predetermined value, it is judged whether or not the previous vehicle speed was greater than the predetermined value (step S74). If the previous vehicle speed was greater than the predetermined value, the highlighted one-way traffic marks are changed to one-way traffic marks displayed in the ordinary display mode (step S75). In this case, one-way traffic marks around the present location may be highlighted, or a search range may be set by distance or angle and varied according to the vehicle speed, as described above. In a case where one-way traffic marks cannot be retrieved because none of them have been registered in the structure-shape map data, one-way traffic marks may be displayed by judging whether or not each particular road is a one-way road by the classification in the road data. Not only one-way traffic marks but also other marks indicating railroad crossings, pedestrian crossings, traffic signals and so forth may be subjected to the display control described above. In particular, a road into which entry is prohibited may be highlighted. The highlighting mode may be such that information desired to be highlighted is displayed more noticeably than other information currently displayed, or only information desired to be highlighted is displayed on the screen. It should be noted that to display only information desired to be highlighted on the screen, information other than the information desired to be highlighted may be deleted from the screen, or only information desired to be highlighted may be selected and subjected to drawing processing. In the example shown in FIG. 10(C), a one-way road is connected to the suggested road at a position behind the present location. However, the one-way road does not lie in the direction of travel. Therefore, one-way traffic marks displayed in FIG. 10(B) are deleted, but only one-way traffic marks in the direction of travel are displayed, thereby being highlighted consequently.

Figure 14:
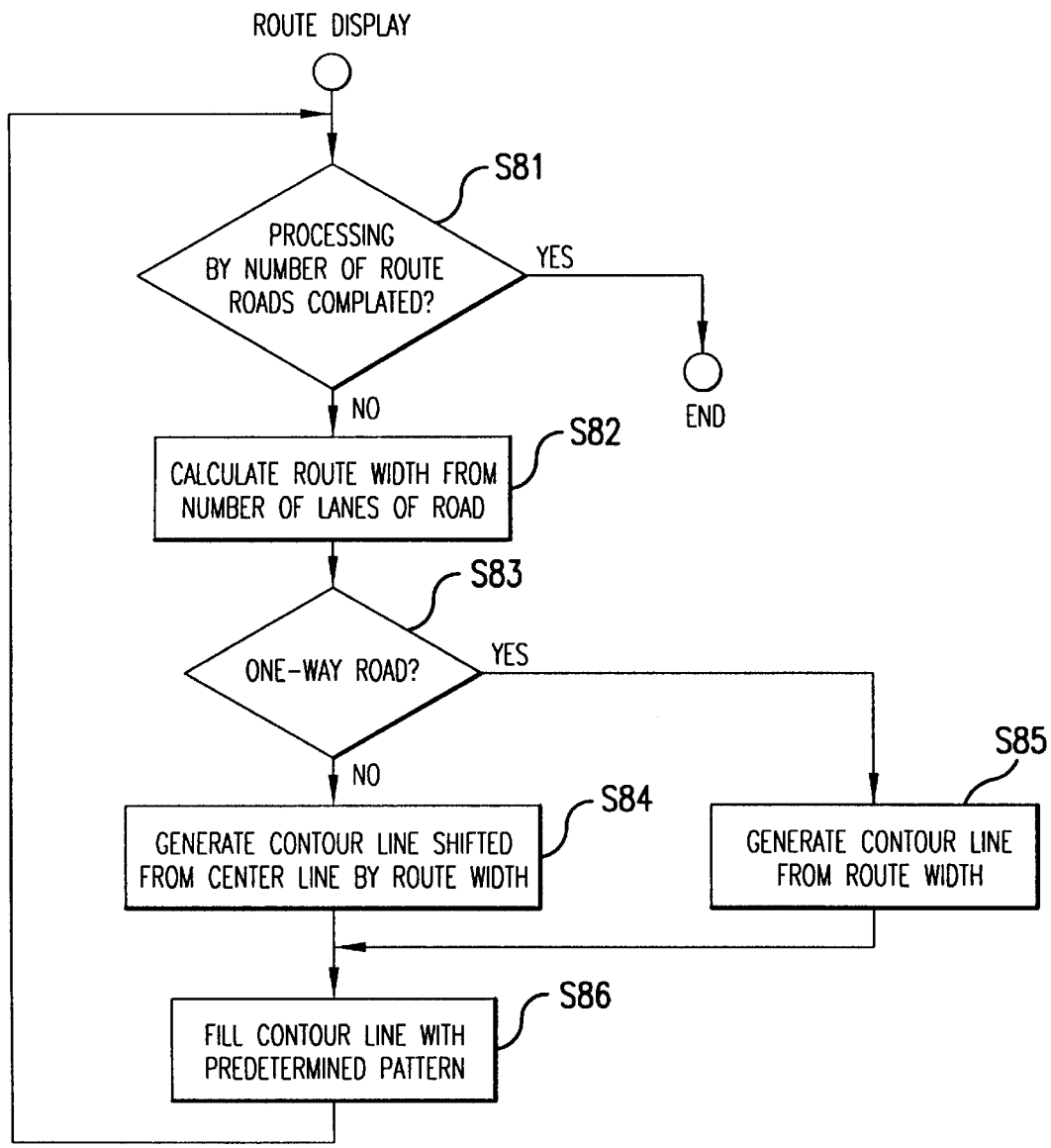
FIG. 14 is a flowchart for describing an example of the processing for displaying a route.

In a case where a route display is performed on a road map, the road is displayed in the form of a single line. Therefore, it is only necessary to display the road in a specific color. However, in a case where a route display is performed on a structure-shape map, lines at both sides and a center line are drawn, and the route is displayed according to the actual width. Therefore, it is necessary to display the route off the center line, that is, on the traveling lane side. In the route display, as shown in FIG. 14, the following processing is repeated (step S81) until processing for the number of route roads has been executed for each road number based upon the suggested-road data. A route width is calculated from the number of lanes of a route road (step S82), and it is judged whether or not the road is a one-way road (step S83). If it is a one-way road, a contour line is generated from the route width (step S85), If the road is not a one-way road, a contour line is generated from the route width by shifting the route by ½ of the route width, that is, by an amount to which the route extends to the opposite lane from the center line (step S84). Then, the contour line is filled with a predetermined pattern as shown at 62, 71 to 73 in FIGS. 11(A) and 11(B) and in FIG. 10(C) (step S86).

Suggested-road data prepared from the road-map data has information regarding each road, as shown in FIGS. 2(A) through 4(B). Therefore, by utilizing the information, suggested-road data can be matched with a structure-shape map. Thus, road information, e.g. lane information and road names, can be displayed in a readily perceivable manner by displaying a route in the form of a mesh or other shaded pattern of road width. Moreover, when there are a plurality of lanes, a specific lane is selected from among them, as shown at 73 in FIG. 11(B) to perform a route display by utilizing information instructing the driver to bear right, bear left or bear towards the center in the travel guidance data shown in FIG. 4(B). In the route display shown in FIG. 11(B), the route 71 on which the present position lies is a one-way road. Therefore, a pattern is drawn in the center of the road. However, when the driver turns left from the route 71, which is a one-way road, to the route 72, which is a main street, the driver is instructed to bear towards the center as indicated by the illustrated pattern from the route 72 to the route 73 because the driver is going to turn right from the route 73 to the route 74 at the next intersection immediately after the left turn.

Figure 15:
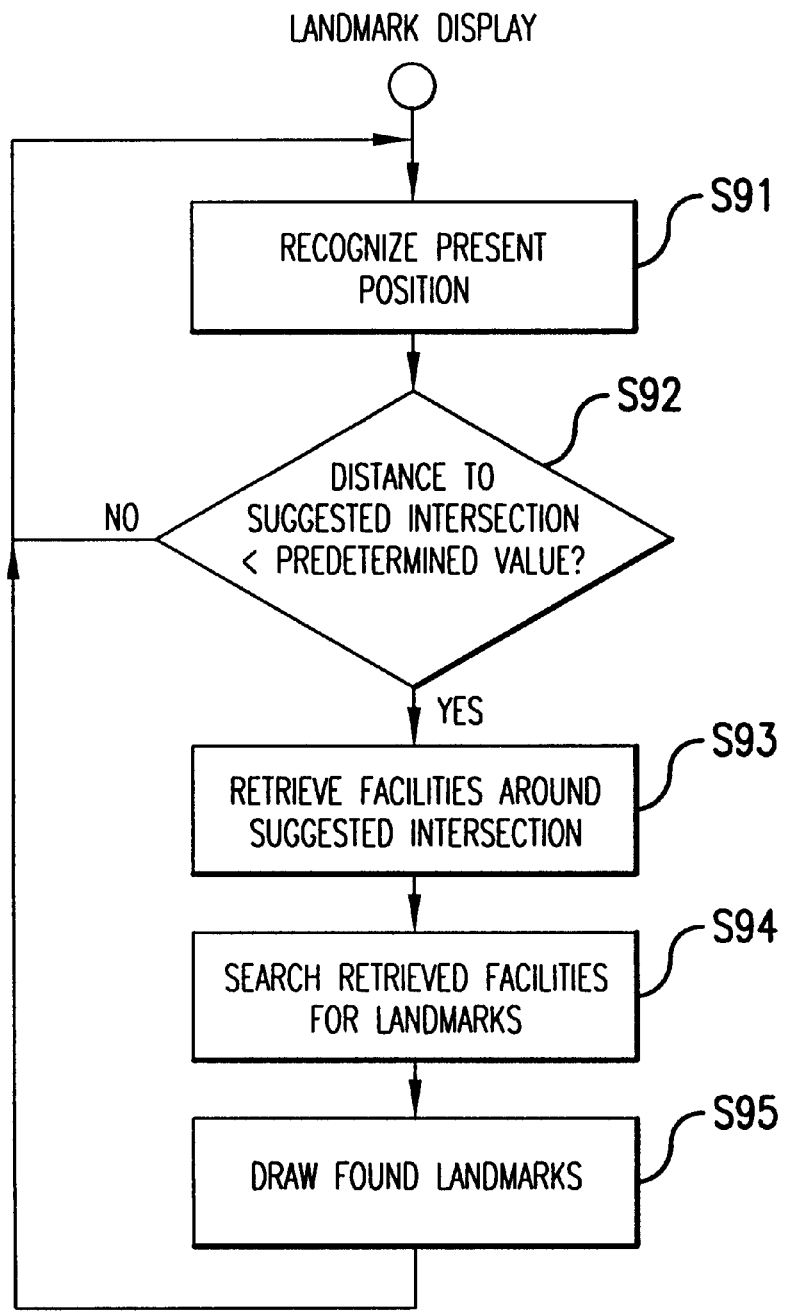
FIG. 15 is a flowchart for describing an example of the processing for displaying landmarks.

In a case where route guidance is provided by using a road map, when the vehicle approaches an intersection at which guidance is required, the conventional practice is to change the displayed map from the road map to a more detailed intersection guide map with a view to improving the visibility of guidance information. However, in a case where route guidance is provided by a structure-shape map, because the map itself has detailed information, even at a suggested intersection guidance can be provided by displaying characteristic landmarks without displaying an intersection guide map. In the landmark display, as shown in FIG. 15, the present position is recognized (step S91), and it is judged whether or not the distance to a suggested intersection is within a predetermined value (step S92). If the distance is within the predetermined value, facilities around the suggested intersection are retrieved (step S93). The retrieved facilities are searched for landmarks which can be displayed (step S94), and landmarks found are drawn at the positions of the retrieved facilities (step S95). In a case where there are facilities, for example, a gasoline station, a bank, governmental or municipal facilities (e.g. a police station, fire station, public office, post office, school, etc.), a convenience store, a family restaurant and so forth, around an intersection at which guidance is required, landmarks comprising various patterns, e.g. service marks and character marks, indicating such facilities are displayed as shown in FIG. 10(C), by way of example. By doing so, intersection and route guidance can be provided in a readily perceivable manner without a need of particularly changing the displayed map from the structure-shape map to an intersection guide map as in the conventional practice. For facilities that generally have no particular marks, characters may be displayed as in the case of "Public office" shown in FIG. 10(C). It should be noted that the predetermined value used as a criterion for the judgment of the distance to a suggested intersection may be changed according to the vehicle speed. If a means for retrieving landmark information around the sensed present position is provided, landmarks are displayed according as the present position moves, thereby making it easy to verify the present position. The arrangement may be such that only landmarks along a route are displayed by providing a means for retrieving landmark information around the route. Moreover, landmarks to be displayed may be controlled by retrieving landmark information lying in the direction of travel ahead of the present position. In a case where landmarks around the present position are displayed, the range or distance for retrieval may be changed according to the vehicle speed. Moreover, the arrangement may be such that retrieval is executed over a wide range, and landmark information to be displayed is selected according to the vehicle speed.

The following is a description of the system operation for loading a program into the flash memory 41 from a CD-ROM as the information storage device 3 in which the program and data have been recorded.

As has been described above, the navigation system according to the present invention contains a flash memory 41 of relatively large capacity for reading in a program from a CD-ROM as an external storage device, and a ROM 42 of small capacity for storing a program (program read means) for CD boot-up processing. The flash memory 41 is a non-volatile storage means, in which stored information is retained even when the power supply is cut off. As CD boot-up processing, the program in the ROM 42, which is a program read means, is started to check the program stored in the flash memory 41, and disk management information in a CD-ROM as the information storage device 3 is read in. Program loading processing (update processing) is executed by judging the disk management information and the state of the flash memory 41.

Figure 16:
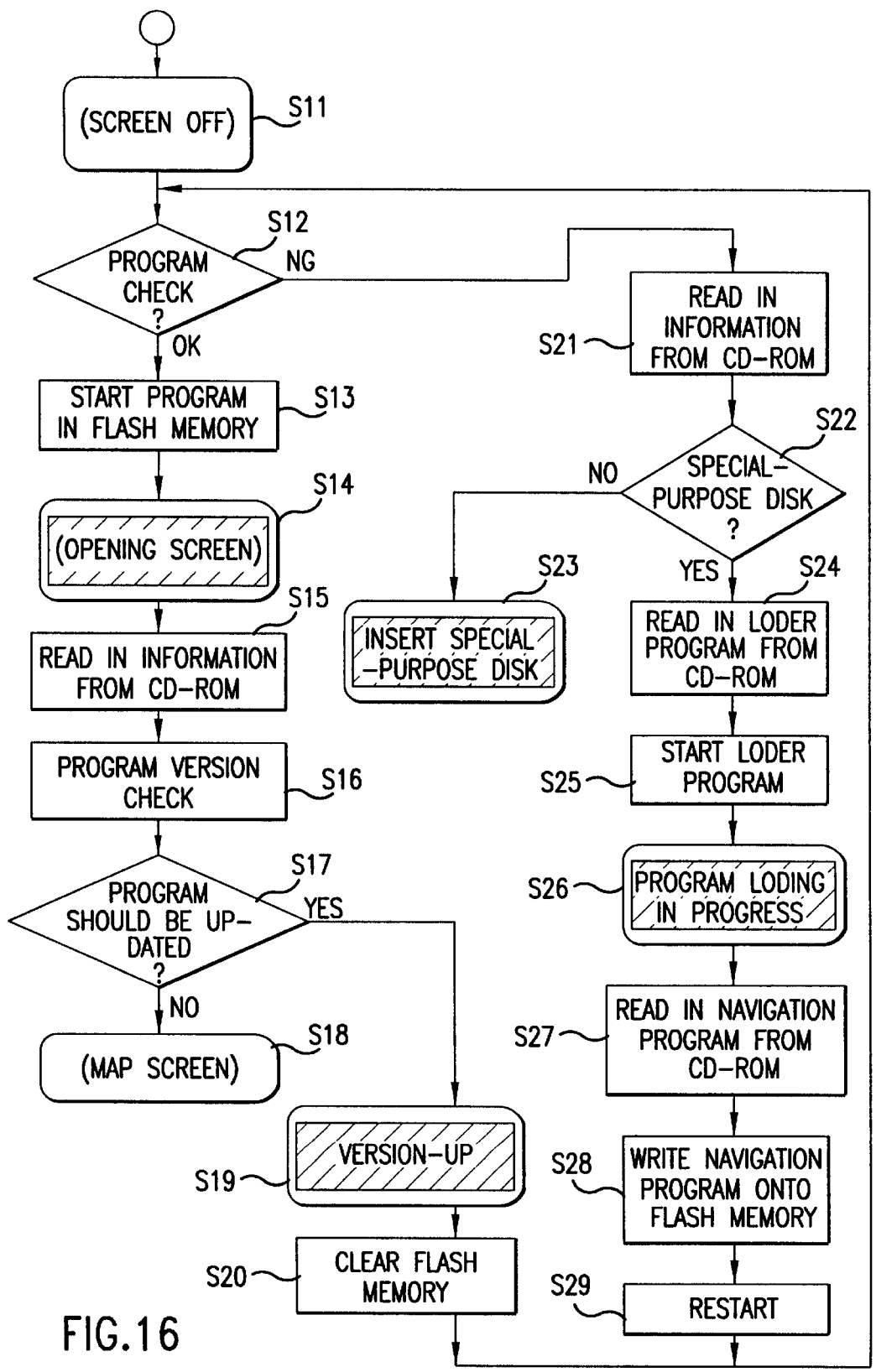
FIG. 16 is a flowchart for describing program loading processing.

First, when the power supply is turned on, as shown in FIG. 16, with the screen left OFF (step S11), a program check is performed as to whether or not a program has been normally written onto the flash memory (step S12). If the result of the program check is OK, the program stored in the flash memory is started (step S13), and an opening screen is displayed (step S14). Then, disk management information in the CD-ROM is read in (step S15), and the program version is checked from the version No. of the program in the CD-ROM and the version No. of the program stored in the flash memory (step S16). Whether to update the program is judged on the basis of the program version comparison (step S17). If the program in the CD-ROM has not been upgraded to a version higher than the version of the program in the flash memory, the program in the flash memory is driven, without updating, to display a map screen (step S18). However, if the program in the CD-ROM has been upgraded to a higher version, the screen is changed to a version-up screen (step S19), and the flash memory is cleared (step S20). Then, the process returns to step S12.

If the result of the program check performed at step S12 is NG, disk management information in the CD-ROM is read in (step S21), and first a check is made as to whether or not it is a special-purpose disk (step S22). If it is not a special-purpose disk, a guide message to the effect "PLEASE INSERT SPECIAL-PURPOSE DISK" is displayed on the screen (step S23), whereas, if it is a special-purpose disk, a loader program in the CD-ROM is read in (step S24), and the loader program is started (step S25). Then, a message to the effect "PROGRAM LOADING IN PROGRESS" is displayed (step S26), and a navigation program in the CD-ROM is read in (step S27) and written onto the flash memory (step S28). Then, the program is restarted (step S29), and the process returns to step S12. Thus, where a program has been normally written onto the flash memory, even if a compatible CD-ROM is set, the version of the program in the flash memory and the version of the program in the CD-ROM are compared with each other, and only when the CD-ROM has an upgraded program, the program in the flash memory is updated. By doing so, the system can always be operated by the latest program without useless program loading.

Figure 17:
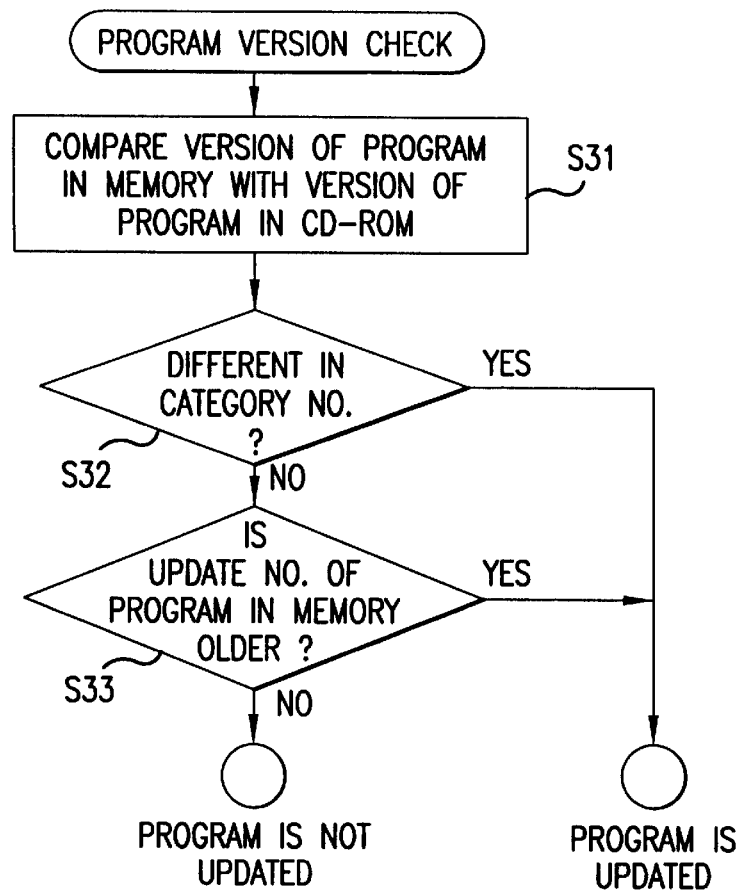
FIG. 17 is a flowchart for describing program version check processing.

In the version check processing at steps S16 to S17, as shown in FIG. 17, the version of the program in the flash memory and the version of the program in the CD-ROM are compared (step S31), and a check is made as to whether the two programs are different in category No. from each other (step S32). If the two programs are not different in category No., a check is made as to whether or not the update No. of the program in the flash memory is older than that in the CD-ROM (step S33). If the two programs are different in category No., or if the update No. of the program in the flash memory is older than that in the CD-ROM although the two programs are not different in category No., the program is updated. If the two programs are not different in category No. and the update No. of the program in the flash memory is not older than that in the CD-ROM, the program is not updated.

Figure 18:
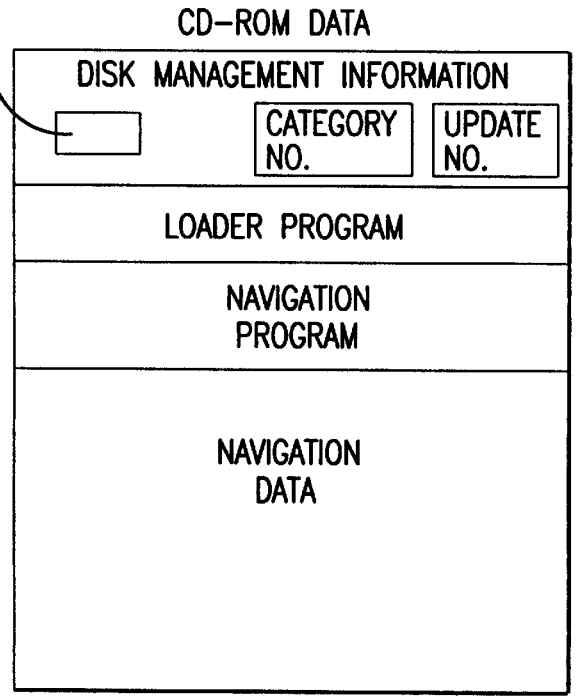
FIG. 18 is a diagram for describing the structure of CD-ROM data.

As shown for example in FIG. 18, the structure of the CD-ROM data comprises disk management information, a loader program, a program for navigation, and data for navigation. The disk management information possesses information such as classification of the CD-ROM (e.g. CD-ROM for navigation, CD-ROM for music, CD-ROM for video, etc.). If the CD-ROM is for navigation, the disk management information further has category No. for classification by use application, that is, whether the CD-ROM is a district version or nationwide version and used for sightseeing or leisure, and classification by genre. The disk management information also has update No. In the case of a CD-ROM for navigation, if it is a district version, CD-ROM data has its area in the form of coordinates, thereby enabling the district to be identified by the coordinates. As has been described above, the program for navigation comprises an application section and an OS section. The application section includes a map drawing part, a route finding part, a route guidance part, a present-position calculating part, a destination setting operation control part, etc. The navigation data includes map data, search data, guidance data, map matching data, destination data, etc.

In a case where a CD changer is used in combination with the program read means, CDs can be automatically changed over based on an changeover instruction. When a CD is designated, processing for reading CD disk management information (disk label) is executed, and a CD to be driven is selected by judging the contents of the disk management information. If the selected CD is a CD for navigation, the category No. and update (version) No. of the selected CD are checked, and the above-described program memory update processing is executed.

It should be noted that the present invention is not limited to the foregoing embodiment but can be modified in a variety of ways. For example, although in the foregoing embodiment the display of building shapes, other than roads, is restricted nondiscriminatingly, building shapes may be classified into those which are restrictedly displayed and those which are displayed without restriction. It is also possible to select building shapes the display of which is restricted according to the vehicle speed even during travel. It is also possible to select building shapes the display of which is restricted during scrolling. A changeover of maps may be so performed that a road map is displayed for guidance before the vehicle approaches the vicinity of a destination, and the map is changed over to a structure-shape map on the condition that the vehicle has approached the vicinity of the destination.

As will be clear from the foregoing description, according to the present invention, building shapes are not substantially displayed during travel. Therefore, only information relating to roads, which is necessary for travel, can be displayed on a structure-shape map. By arranging the system such that building shapes are not displayed during scrolling, scroll speed can be increased, and it is possible to solve the problem that a delay in drawing building shapes makes the map difficult to see. Moreover, because information regarding roads is displayed, it is possible to provide necessary and minimum information for roads.

Figure 19:
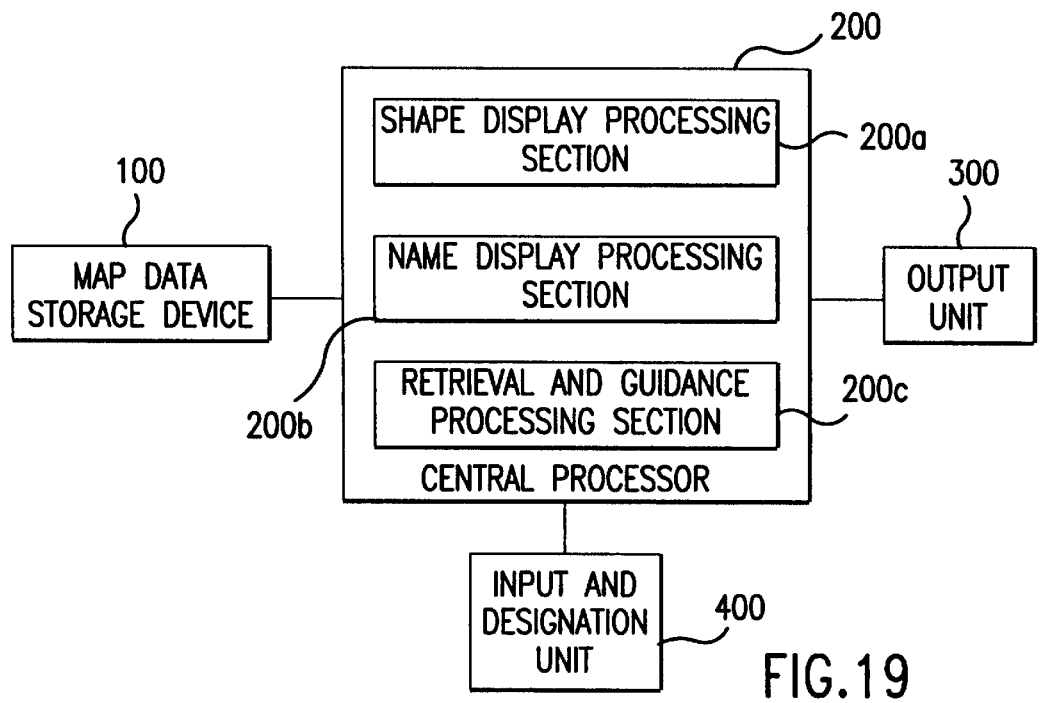
FIG. 19 is a diagram showing another embodiment of a navigation system using a structure-shape map according to the present invention.

Next, a navigation system using the above-described structure-shape map will be described with reference to FIG. 19. Referring to FIG. 19, a map data storage device 100 stores structure-shape map data for drawing and displaying shapes of various structures such as buildings (general houses, office buildings, apartment houses, fire stations, department stores, hospitals, railroad stations, etc.), facilities (towers, parks, amusement parks, athletic fields, etc.), bridges, roads, and so forth, as has already been described in connection with FIGS. 5(A) and 5(B). The map data storage device 100 may further store road-map data, residence-map data, etc. The structure-shape map data has information such as a coordinate string of a plurality of coordinate values for drawing and displaying a shape of a structure, a name and address of the structure, various information belonging to the structure, e.g. classification, height, and construction (residents), and a telephone number thereof. A central processor 200 reads out structure-shape map data within a range for display from the map data storage device 100, decides a color for each shape, for example, as a display mode from the classification, height and other detailed information (scale of construction, etc.) regarding structures, draws a shape and name of a structure for each name as a structure-shape map based upon the coordinate strings, and displays the structure-shape map. When a structure is selected from the displayed structure-shape map, the central processor 200 retrieves information belonging to the structure and surrounding information and outputs the retrieved information for guidance, and it also displays a shape map centered on the structure from information belonging to the structure. A shape display processing section 200a executes processing for drawing and displaying a shape map of structures in different display modes, which differ in color, color density or pattern thereof, based upon the classification, height and the scale of construction, by way of example. A name display processing section 200b executes processing for drawing and displaying names of principal structures on the shape map displayed by the shape display processing section 200a. A retrieval and guidance processing section 200c retrieves various information relating to a structure, e.g. a list of names of companies, offices, stores, etc. occupying a building, telephone numbers, and similar information (surrounding information) existing around the structure, and provides guidance. The retrieval and guidance processing section 200c also retrieves a structure from its telephone number or name and provides guidance using a shape map. An output unit 300 includes a display unit for displaying a structure-shape map and guidance information delivered from the central processor 200, a printer for printing out such information, etc. An input and designation unit 400 is used to designate and select an output range (area) of a structure-shape map, an area of structure on the map, information guidance regarding a structure, retrieval of surrounding information, etc. Examples of devices usable as the input and designation unit 400 are a touch panel combined with the display screen of the output unit 300, a pointing device such as a joystick or a mouse, and a remote controller.

Figure 20:
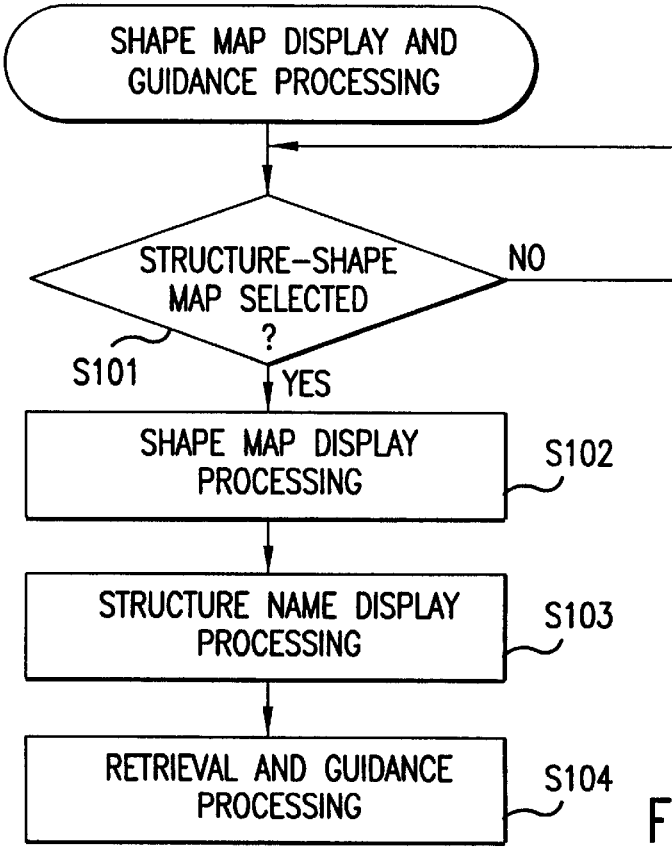
FIG. 20 is a flowchart for describing the processing for display and guidance using a structure-shape map and the processing for displaying shapes.

In the central processor 200, as shown in FIG. 20, when a structure-shape map is selected (step S101) in a state where a road map drawn on a selected scale is being displayed, by way of example, first processing for displaying a shape map is executed (step S102), and processing for displaying structure names on the shape map is executed (step S103). Thereafter, retrieval and guidance processing is executed (step S104) by using a structure-shape map with regard to information belonging to structures, i.e. in the case of a building, such information as specific names of tenants, e.g. stores, offices, etc. occupying the building, type and nature of business of each tenant, and their telephone numbers. In the case of an general house or building or other building structure, its planar shape is displayed as structure shape. In the case of a park or a road, its planar topography is displayed. Accordingly, in the case of a building containing a large number of residents, there is information regarding the residents of the building. Therefore, even a single structure-shape may have a large amount of information. For this reason, in the shape-map display processing at step S102 and in the structure-name display processing at step S103, shapes of structures and public facilities which have a large amount of information are displayed in an easily recognizable form which is different from a display form for general houses, as has already been described in connection with FIGS. 8(A)–8(C) and 9. Moreover, for such structures and public facilities, their names are displayed with priority. Any overlapping names are not displayed. Furthermore, names of blocks and public facilities are given high priority. Thus, structure names are displayed in the following order: names of blocks, names of public facilities, and names of structures having a large amount information regarding their contents.

Next, retrieval and guidance using a structure-shape map will be described.

Figure 22:
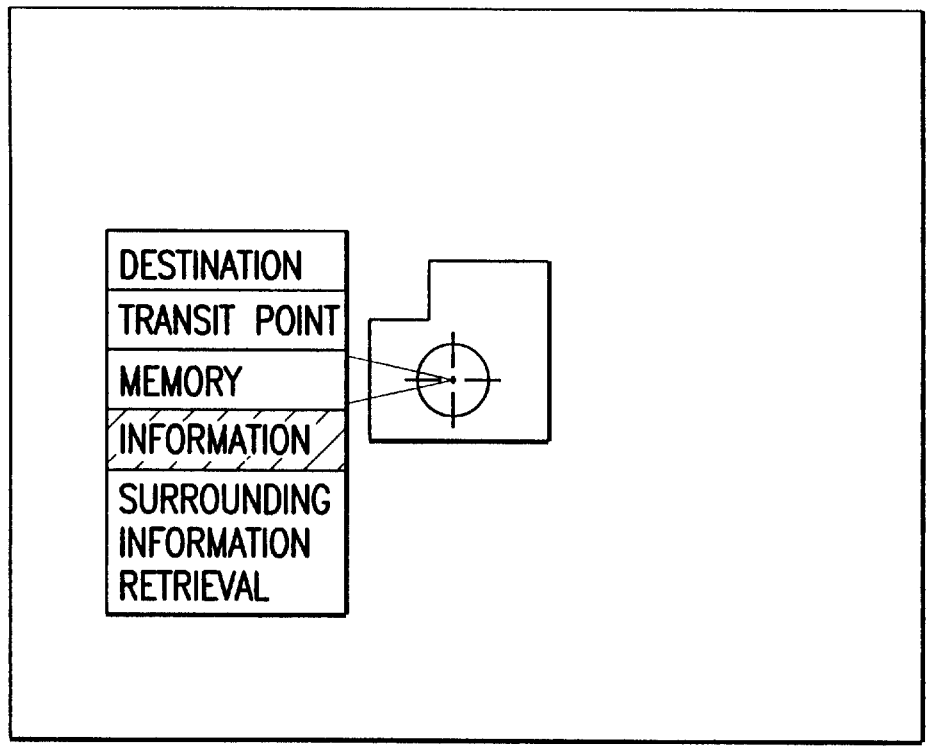
FIG. 22 is a diagram showing an example of a screen during a structure selecting operation using a structure-shape map.

The use of a structure-shape map displayed as described above makes it possible to retrieve not only information regarding the displayed structures but also information regarding surroundings of each structure based on the data described in connected with FIGS. 5(A) and 5(B). Moreover, it is possible to provide guidance for information regarding the inside of each structure. In the case of a structure-shape map, for example, a cursor in the shape of a combination of a circle and a cross, such as that shown in FIG. 22, is displayed at the center of the map. When an instruction to select a structure is entered from the input and designation means, the designated structure is selected.

Figure 21:
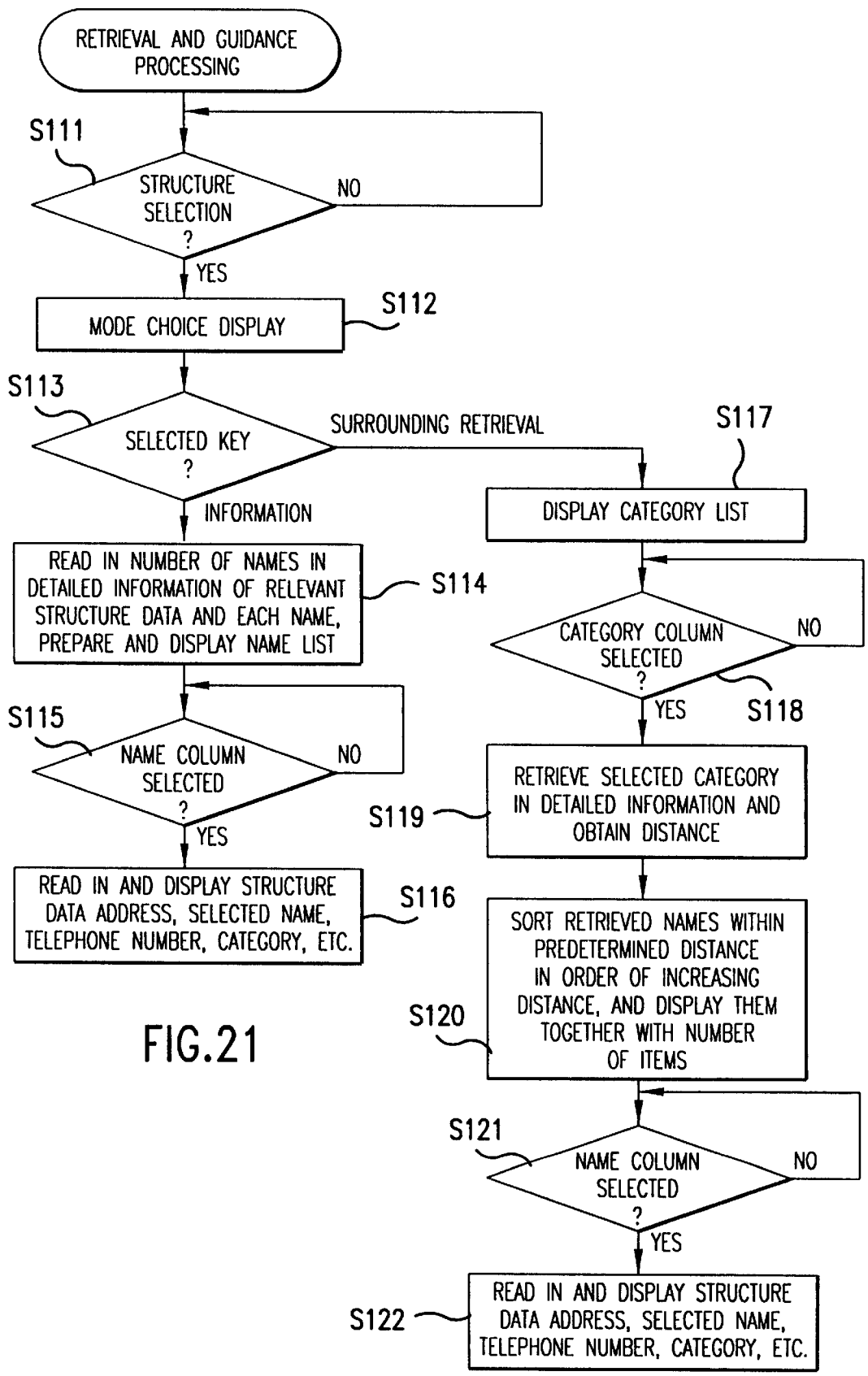
FIG. 21 is a flowchart for describing the processing for retrieval and guidance using a structure-shape map.

Accordingly, in the retrieval and guidance processing, as shown in FIG. 21, designation of structure selection is awaited (step S111). When structure selection is designated, as shown in FIG. 22, a list of choices is displayed to allow selection of any of destination, transit point, memory, information and surrounding information retrieval modes (step S112). The destination, transit point and memory modes are used to perform location setting for route finding processing when the present invention is incorporated into a navigation system for vehicles (described later). Therefore, a description of these modes is omitted. In the following, only the information and surrounding information retrieval modes will be described.

Figure 23:
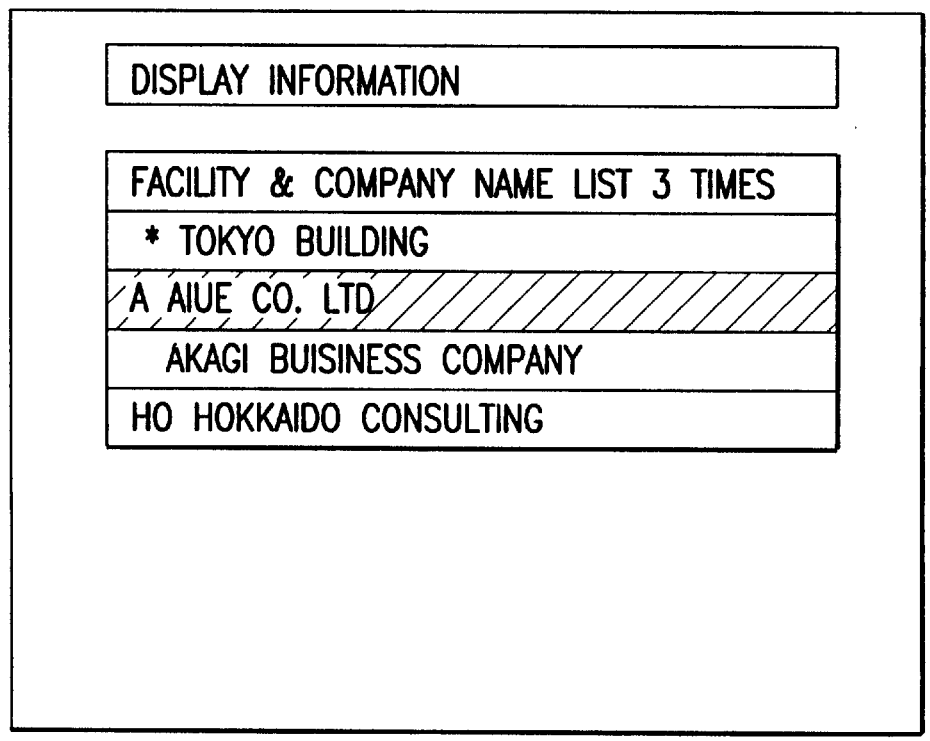
FIG. 23 is a diagram showing an example of an information display screen.

Thereupon, a check is made as to whether the selected key is for the information or surrounding information retrieval mode (step S113). If the column "Information" has been selected as shown in FIG. 22, the number of names in detailed information of the relevant structure data, together with each name, is read in to prepare a hierarchical list of names arranged in character-string order, and these items of information are displayed as shown in FIG. 23 (step S114). If one of the name columns displayed, for example, AIUE Co., Ltd., is selected as shown in FIG. 23 (step S115), the address, the selected name, telephone number, category, etc. are read from the structure data, and the name, telephone number and address of AIUE Co., Ltd. are displayed as shown in FIG. 24 (step S116). It should be noted that "Return", "Destination", "Transit point" and "Memory" displayed on the screen are operation keys. If any of the operation keys is selected, associated processing is executed by an interrupt operation. In a case where an instruction other than selection of a name column is issued, other processing corresponding to the instruction is similarly executed by an interrupt operation.

Figure 26:
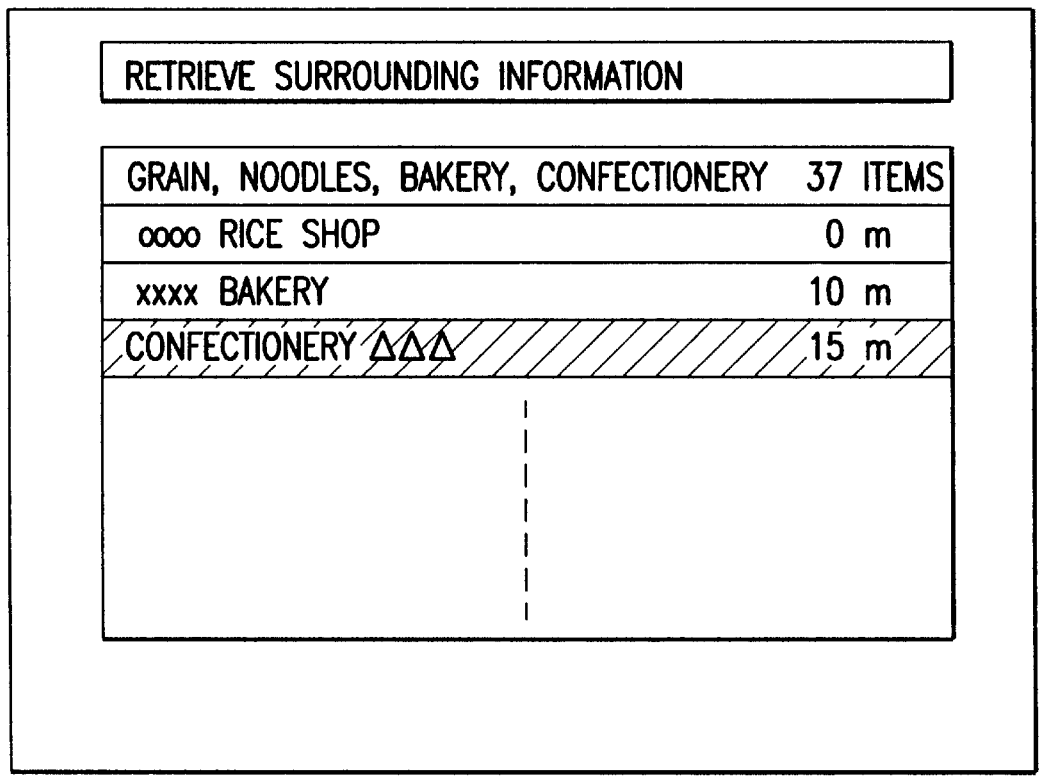
FIG. 26 is a diagram showing an example of a genre retrieval screen.

If the column "Surrounding information retrieval" is selected at step S113, first, as shown in FIG. 25, a genre list (category list) containing "Production and sale of fiber & textile", "Dyeing and design of fiber & textile", . . . , etc. is displayed to specify a range for retrieving surrounding information (step S117). When a certain category column is selected (step S118), the selected category is retrieved from the detailed information in the data, and the distance from the selected structure to each location retrieved is obtained (step S119). Then, names retrieved within a predetermined distance are sorted in order of increasing distance, and, as shown in FIG. 26, a list containing the genre name, the number of items, each name retrieved, and the distance from the retrieval location is displayed (step S120). When one of the name columns is selected (step S121), the address, the selected name, telephone number, category, etc. are read from the structure data and displayed (step S122) in the same way as in the case of FIG. 24. If the return key is entered in this state, a structure-shape map of surroundings centered on this structure is displayed. It is, of course, possible to display a structure-shape map or change over the display to another map, e.g. a road map, by using another key (not shown). In a case where an instruction other than selection of a category column is issued at step S118, or an instruction other than selection of a name column is issued at step S121, other processing corresponding to the instruction is executed by an interrupt operation.

The use of the navigation system using a structure-shape map according to the present invention makes it possible to acquire information regarding companies, offices, stores, various organizations, etc. occupying a structure, and a telephone number, etc. of each individual company from the structure-shape map. It is also possible to retrieve and list various companies, stores, organizations, etc. within a predetermined range from a structure concerned, and to investigate the structure. Conversely, a structure-shape map centered on a structure concerned can be readily displayed by inputting its telephone number and name and retrieving the corresponding name and telephone number from the names and telephone numbers in the name and detailed information of the map data shown in FIGS. 5(A) and 5(B). Accordingly, in a case where the user has no information regarding a certain structure although he or she possesses information regarding its name and category and has general idea of the district, it is possible to search for the structure, e.g. a building where a tenant in question resides. It is also possible to provide guidance about a tenant residing in a certain building. Therefore, if the arrangement according to the present invention is utilized for location setting in a navigation system for vehicles, by way of example, location setting in an urban area is facilitated. Further, if the arrangement is such that when a road is designated as one of structures, information indicating whether or not there are parking meters can be provided as information relating to roads, it is possible to provide information regarding parking when the user moves in a car.

It should be noted that the present invention is not limited to the foregoing embodiment but can be modified in a variety of ways. For example, although in the foregoing embodiment colors and other display modes are decided based upon information such as height, the number of residents, classification, category, etc., display modes may be individually set in advance. For example, a display mode may be added to the top of a coordinate string. Although x and y coordinate strings are used as data representing shapes of structures, the arrangement may be such that structure-shape data is held in the form of three-dimensional coordinate data by combining x and y coordinate strings with coordinate values (z) in the heightwise direction, and that when a structure shape is shown in a plan view, only an x and y coordinate string is used, whereas, when a structure shape is shown in a three-dimensional shape drawing such as a perspective view, an x, y and z coordinate string is used. Moreover, the present invention can provide even more careful location guidance when incorporated into a navigation system for vehicles. However, the present invention may be used merely to give guidance for an urban area, a sightseeing area, etc. and print out information for guidance service.

Moreover, although in the foregoing embodiment the present invention has been described using structure names as information regarding names, the structure names may include names of blocks and names of other districts. Although in the foregoing description processing is executed with regard to all names, the arrangement may be such that information indicating precedence according to which names are displayed on a map or information indicating whether or not each particular name should be displayed is set or added to each name in advance, and names are displayed based upon this information. Alternatively, structures in which the number of names is greater than a predetermined value or which are higher than a predetermined height may be subjected to processing.

As will be clear from the foregoing description, according to the present invention, when structure-shape map data, stored in the form of coordinate strings, is to be displayed, colors and other display modes are decided based upon the classification, height, etc. of each particular structure. Therefore, even in the case of a map of a labyrinthian congested district, it is possible to instantaneously recognize the features of shapes and the features of structures characterized by the classification, height, etc. of each particular structure. Moreover, even structures of equal size can be distinguished from each other for the difference in scale by deciding display modes based upon the height, the number of residents, etc.

For example, when a map is displayed, a shape is displayed, and data that has specific information with respect to the shape is displayed in a different color, thereby making it easy to recognize a specific location in a case where a location is set with the system according to the present invention used as a navigation system. If displayed shapes are varied in color according to the size of thereof, it is possible to readily judge a size relationship between building structures and to recognize the features of the map area concerned. In a case where display colors are varied according to the classification of shapes, the distribution of shapes in the display area can be recognized. Thus, the visibility can be improved, for example, in a case where facilities are selected according to purposes.

Further, according to the present invention, coordinate strings representing shapes and names of shapes are stored as structure-shape map data, and names are displayed on a map by determining a display range for each name from the associated coordinate string. Therefore, when a road map, a residence map or the like is displayed, a name of an item of the structure-shape map data can be displayed thereon in a display range determined from the coordinate string. Accordingly, even when a plurality of different kinds of map are displayed by changing them from one to another, names of items of the structure-shape map data can be used in common. Thus, the amount of data to be stored can be reduced.

In particular, to display names of structures on a map in a system arranged such that the map display scale can be changed according to use application, data for name display must be stored for each map display scale because of a difference in the size of area capable of being displayed and the number of names capable of being displayed according to the scale. Consequently, the amount of data to be stored increases. Further, in a case where additional information such as information regarding shapes of structures, detailed information, etc. is stored as data, the amount of data concerning additional information further increases. Therefore, it is demanded to reduce the amount of data to be stored. Accordingly, adoption of the arrangement according to the present invention into a system having a plurality of map display scales enables remarkably advantageous effects in terms of achievement of a reduction in the amount of data to be stored.

When the ratio of the amount of structure-shape map data to the display field is high, displayed items may overlap each other, causing the visibility of the displayed map and names to be degraded. According to the present invention, however, display control is effected such that display fields do not overlap by calculating name display positions and display fields. Therefore, degradation of the visibility of the display screen can be prevented. Accordingly, in a case where a location is verified from a displayed map, the visibility of the screen can be improved by the map and guidance display.

Furthermore, names are displayed by judging the order of precedence based upon information regarding structures, such as classification, height, construction (residents), etc. Therefore, processing can be executed such that public facilities are given priority, with general houses eliminated, based upon the classification information, and that high buildings are given priority based upon the height information, and further that buildings containing a large number of residents are given priority based upon detailed information regarding construction (residents). Thus, it is possible to selectively display names of high value in terms of information.

Next, an example of the arrangement of a system adapted to display a structure-shape map using a telephone number will be described.

Figure 27:
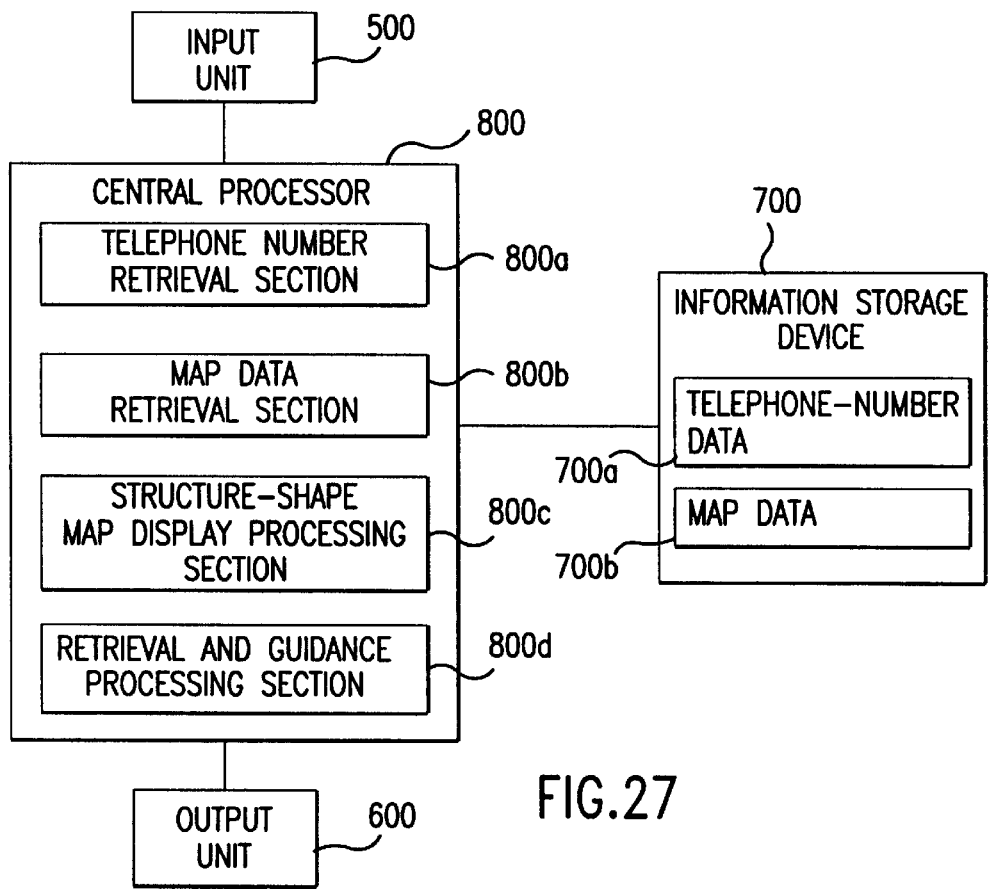
FIG. 27 is a diagram showing a further embodiment of a navigation system using a structure-shape map according to the present invention.

Referring to FIG. 27, an input unit 500 is used to enter an instruction to select a telephone number, an area of a structure on a structure-shape map, information guidance regarding a structure, retrieval of surrounding information, etc. Examples of devices usable as the input unit 500 are a touch panel combined with the display screen of an output unit 600, a pointing device such as a joystick or a mouse, and a remote controller. The output unit 600 includes a display unit for displaying a menu screen, a telephone number input screen, a structure-shape map and an guidance information output screen, which are delivered from a central processor 800, and a printer for printing out necessary information.

An information storage device 700 stores telephone-number data 700a having a coordinate value corresponding to each telephone number, and a map data 700b having information regarding shapes of structures such as buildings, facilities and so forth and information regarding each structure, including a telephone number. The telephone-number data 700a has the coordinates of a representative location for each of the toll and local office numbers and the coordinates of a location of each subscriber's number. The map data 700b is structure-shape map data for drawing and displaying shapes of various structures such as buildings (general houses, office buildings, apartment houses, fire stations, department stores, hospitals, railroad stations, etc.), facilities (towers, parks, amusement parks, athletic fields, etc.), bridges, roads, and so forth. The map data 700b may further have road-map data, residence-map data, etc. The structure-shape map data has a coordinate string comprising a plurality of coordinate values for drawing and displaying the shape of each particular structure, the name and address of the structure, various information belonging to the structure, e.g. classification, height, and construction (residents), telephone number thereof.

The central processor 800 executes, in response to entry of a telephone number, processing for determining a predetermined range by obtaining the corresponding coordinates from the telephone-number data 700a, retrieving the corresponding telephone number from the map data 700b in the determined range, and displaying a structure-shape map centered on a structure having the retrieved telephone number. The central processor 800 also executes processing for performing retrieval and providing guidance about information held in the map data 700b based upon the displayed structure-shape map. The central processor 800 includes a telephone number retrieval section 800a for obtaining coordinates by searching the telephone-number data 700a based upon an entered telephone number. A map data retrieval section 800b determines a predetermined range centered on coordinates retrieved by the telephone number retrieval section 800a, and retrieves a telephone number from the map data 700b. A structure-shape map display processing section 700c executes processing for drawing and displaying a structure-shape map in a display mode which varies in color, color density, pattern thereof, etc. according to classification, height and scale of construction, by way of example, and also drawing and displaying names of principal structures on the structure-shape map. A retrieval and guidance processing section 700d retrieves various information regarding a structure, for example, a list of names of companies, offices, stores, etc. occupying a building, telephone numbers, and similar information existing around the structure (surrounding information) and provides guidance about it. The retrieval and guidance processing section 700d is also adapted to retrieve a structure from its name, for example, and to provide guidance using a shape map.

A specific structure of the telephone-number data 700a is as follows. As shown for example in FIG. 27, the telephone-number data 700a possesses such data as a toll/local office number, east longitude and north latitude of representative location, and address and size of registered telephone number for each of n-number of toll/local office numbers. It is so arranged that registered telephone numbers 700a can be retrieved from a toll number of local office number. A registered telephone number possesses data such as the subscriber's number and east longitude and north latitude of location for each of m-number of registered telephone numbers.

Figure 28:
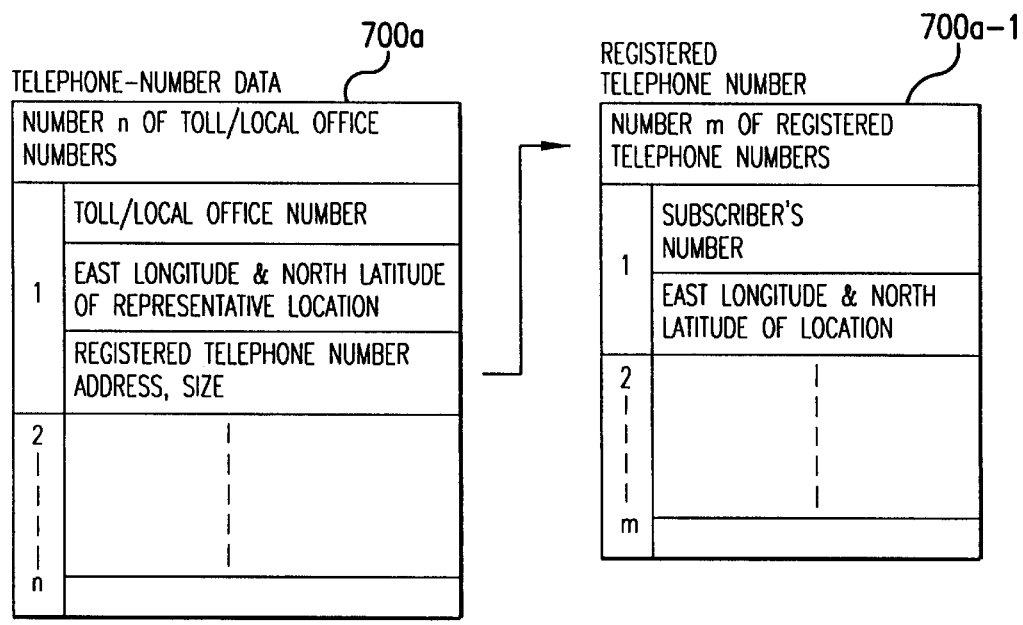
FIG. 28 is a diagram showing an example of the structure of telephone-number data.
Figure 29:
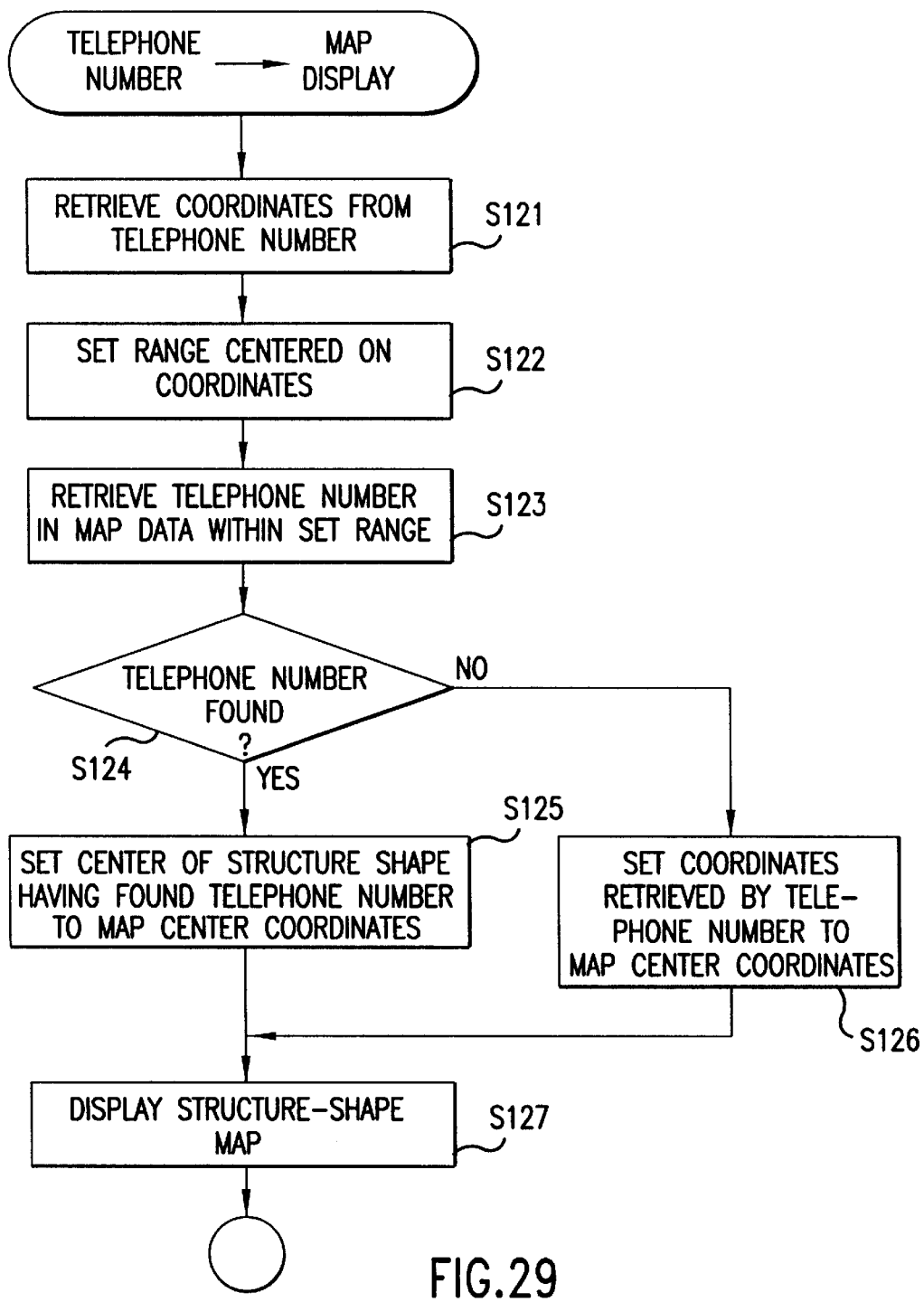
FIG. 29 is a flowchart for describing the processing for displaying a structure-shape map by a telephone number according to the present invention.

Next, processing for displaying a structure-shape map based upon a telephone number will be described. When a telephone number is entered from a telephone number input screen, as shown in FIG. 29, first coordinates are retrieved from the telephone number (step S121), and a range centered on the retrieved coordinates is set (step S122). In a case where the retrieval of the telephone-number data shown in FIG. 28 reveals that there are no east longitude and north latitude coordinates of the registered telephone number or there is no registered telephone number corresponding to the entered telephone number, the east longitude and north latitude coordinates of the representative location are retrieved, and a range for retrieving structure-shape map data shown in FIGS. 5(A) and 5(B) is set from the retrieved coordinates. In this case, if the east longitude and north latitude coordinates of the location of the registered telephone number are acquired, a narrow retrieval range can be set. However, in a case where there is no registered telephone number corresponding to the entered telephone number and the east longitude and north latitude coordinates of the representative location are used to set a retrieval range, a relatively wide retrieval range is set. Next, the telephone number is retrieved in the set range (step S123), and a check is made as to whether or not the telephone number has been found (step S124). In this case, the telephone number is retrieved from the structure-shape map data shown in FIGS. 5(A) and 5(B). However, because coordinates are retrieved at step S121 and a retrieval range centered on the retrieved coordinates is set at step S122, the amount of information to be retrieved can be reduced to a much smaller amount than in a case where the telephone number is retrieved directly from the structure-shape map data. In particular, in the case of the structure-shape map data shown in FIGS. 5(A) and 5(B), telephone numbers are retrieved from the detailed information in which various kinds of information have been stored and the amount of information is large. Therefore, if a telephone number is retrieved directly from the structure-shape map data, an exceedingly long time is required for retrieval. However, the method according to the present invention enables a reduction in the time required and allows information stored in the detailed information to be utilized for a location search. If the telephone number is found, the center position of a structure shape having a registered telephone number corresponding to the found telephone number is set to the map center coordinates (step S125). If the telephone number is not found, the coordinates retrieved by the telephone number are set to the map center coordinates (step S126). Then, a structure-shape map and name are displayed (step S127). Thus, coordinates are retrieved using the telephone-number data from a telephone number, and a retrieval range is set centered on the retrieved coordinates. Then, the structure-shape map data is searched. Accordingly, it is possible to eliminate useless search in the structure-shape map data, and efficient telephone number retrieval can be performed. Moreover, the retrieval speed can be increased. Furthermore, a location retrieval of high retrieval accuracy can be performed because a location can be retrieved by using detailed information concerning structures.

Figures 32, 33A, 33B:
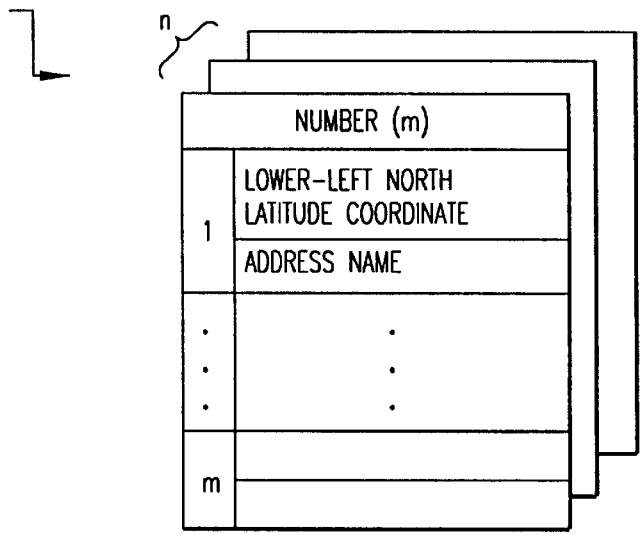
FIG. 32 is a diagram showing an example of the composition of a registered-location data file.
FIGS. 33(A) and 33(B) are diagrams showing an example of the composition of an address data file.

A telephone-number data file may be stored in the information storage device 3 of the above-described navigation system for vehicles. As shown for example in FIGS. 31(A) –31(D), the telephone-number data file comprises telephone-number data, a registered telephone number, landmark data and location data. The telephone-number data points to the registered telephone number and to the landmark data, and the landmark data points to the location data. The telephone-number data possesses such data as a toll number and local office number, east longitude and north latitude of representative location, map display scale, address and size of registered telephone number, and address and size of landmark data. It is so arranged that registered telephone numbers can be retrieved from a toll number or local office number and so that location data can be retrieved for each genre. A registered telephone number possesses data such as the subscriber's number, subscriber's name, east longitude and north latitude of location, map display scale and registered location number. Landmark data includes such data as genre name as well as the address and size of location data. Location data includes such data as location data name and its reading, east longitude and north latitude of location, map display scale and registered location number. As shown in FIG. 32, registered-location number data includes information serving as a registered location classification and indicating whether the data is a generally registered location or from a classified telephone directory, as well as a number within the classification. As shown in FIGS. 33(A) and 33(B), address data includes a lower-left east longitude coordinate and a north-latitude data address in the form of a mesh of predetermined distances, and a lower-left north latitude coordinate and address name of a point ahead. The data is so arranged that the name of an address can be retrieved from coordinates of east longitude and north latitude.

Accordingly, when a telephone number is entered, a subscriber's number which coincides with the registered telephone number is searched from the toll number or local office number of the telephone-number data. If the subscriber's number is retrieved, then the name of the subscriber is acquired. If the subscriber's number is not retrieved, genre names are displayed from the landmark data and location data names of a genre name designated from among these genre names are displayed. At this time, the location data names are displayed in character-string order set in a hierarchical structure based upon the reading of the location data in such a manner that the location data names will be easy to retrieve, and a search operation is also performed by the scroll button. When the subscriber's name and location data names are displayed, the address name also is acquired and displayed simultaneously by the address data based upon the coordinates of east longitude and north latitude. In a case where the subscriber's number is retrieved or the subscriber's number fails to be retrieved and a location registered by genre is selected in the manner set forth, a map of surroundings centered on the location is displayed based upon the east longitude and north latitude of the location and the scale of the map display. However, in a case where the desired location has not been registered even as a location classified by genre, a map of surroundings is displayed centered on a representative location set in advance by a toll number or local office number based upon the east longitude and north latitude of the representative location and the map display scale in the telephone-number data. The desired location is entered in the form of coordinates from the map while the map is being scrolled. The structure-shape map according to the present invention can be adopted as a map displayed to enter the desired location.

Figure 30:
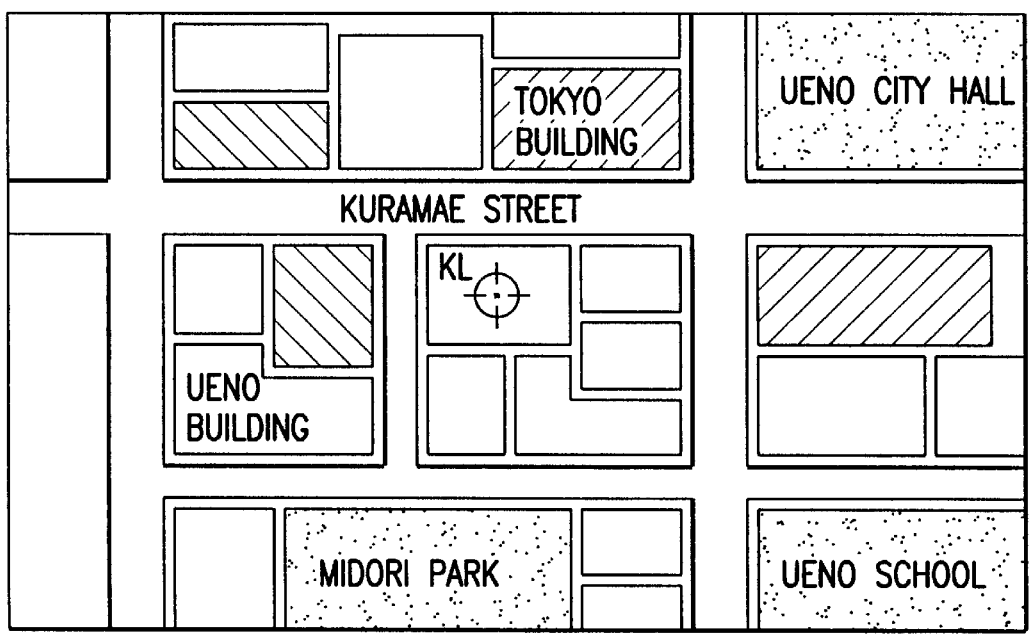
FIG. 30 is a diagram showing an example of a screen displaying a structure-shape map.

If a navigation system for vehicles has telephone-number data, structure-shape map data and road data as stored data and is arranged to enable retrieval of a location by entry of a telephone number as in the present invention, the system can be used for a variety of applications. For example, the data shown in FIGS. 28 and 5 is accessed by entry of a telephone number, and display processing shown in FIGS. 29, 8 and 9 is executed to thereby display a structure-shape map as shown in FIG. 30. Thereupon, if location verification (designation or selection) is executed, it is possible to select the mode of location setting, information or surrounding information retrieval regarding a structure at that location by using the screen shown in FIG. 22. At a destination, a transit point or a memory location, setting and registration of the location is executed, thereby performing a route search using the coordinates of the location. Thus, route guidance using a road map can be provided. In the information or surrounding information retrieval mode, it is possible to verify or retrieve information as described in connection with FIGS. 23 through 25. Therefore, it is possible to verify detailed information about the location and also retrieve and verify surrounding information.

It should be noted that the present invention is not limited to the foregoing embodiment but can be modified in a variety of ways. For example, although in the foregoing embodiment the arrangement is such that telephone-number data having a coordinate value corresponding to each telephone number is stored, and after coordinates have been acquired from a telephone number, telephone numbers in the road data are retrieved in a predetermined range centered on the acquired coordinates, the telephone numbers in the map data may be retrieved directly.

As will be clear from the foregoing description, according to the present invention, road data is stored which has information regarding shapes of various structures, such as buildings, facilities and so forth, and information belonging to the structures, including telephone numbers, and a telephone number registered in the structure-shape map data is retrieved on the basis of an entered telephone number. Then, a structure-shape map centered on a structure having the retrieved telephone number is displayed. Accordingly, a readily recognizable structure-shape map centered on a desired location can be displayed easily by using a telephone number familiar to the user in daily life or work.

What we claim is:

1. A navigation system for providing road guidance by displaying a structure-shape map showing building shapes and roads, said navigation system comprising:

storage means for storing guidance information including information regarding building shapes;

display means for displaying said guidance information; and guidance control means for controlling information displayed on said display means;

wherein said guidance control means sorts the information regarding building shapes stored in said storage means according to a predetermined condition, and controls information displayed on said display means on the basis of the sorted information regarding building shapes.

2. The system according to claim 1, wherein said guidance control means restricts drawing of building shapes by setting a display color for building shapes to a color which is the same as a display color for a background.

3. The system according to claim 1, wherein said guidance control means restricts drawing of building shapes by not drawing any of them.

4. The system according to claim 1, wherein said guidance control means restricts drawing of building shapes when a screen is scrolled.

5. The system according to claim 1, wherein said storage means stores map data having information regarding shape of each of various structures, and information belonging to each of said structures, and said guidance control means decides a display mode on the basis of said information belonging to each of the structures, and controls display of a shape of each structure and information belonging to the structure according to said display mode.

6. The system according to claim 5, wherein said information belonging to each of said structures includes a name, address, classification and height of each of said structures, and detailed information belonging to each of said structures.

7. The system according to claim 6, wherein said detailed information has information indicating the number of names belonging to each of said structures, and for each of said names, information indicating a telephone number, a room number, and a category.

8. The system according to claim 6, wherein said guidance control means decides a display mode on the basis of said structure height.

9. The system according to claim 6, wherein said guidance control means displays only names whose display ranges do not overlap by judging order of precedence from said information belonging to the structures.

10. The system according to claim 6, wherein said guidance control means judges order of precedence of names to be displayed from the classification and height of each structure and the detailed information belonging to each structure.

11. The system according to claim 6, wherein said guidance control means stores names in order of decreasing amount of detailed information belonging to said structures, and displays names in the order in which they have been stored.

12. The system according to claim 6, wherein said guidance control means displays a name of a structure by setting a display range for the name according to the number of characters of the name such that the display range extends over both sides of a center of said structure as displayed, stores the display range for the displayed name, and decides whether or not there is an overlap between said stored display range and a display range for a name to be newly displayed.

13. The system according to claim 1, wherein said storage means stores data regarding a map other than said structure-shape map, together with said structure-shape map, and said guidance control means selectively displays said structure-shape map and said map other than said structure-shape map.

14. The system according to claim 13, wherein said map other than said structure-shape map includes a road map and a residence map.

15. A navigation system comprising:

present-position sensing means for sensing a present position;

storage means for storing guidance information including information regarding building shapes;

condition judging means for judging whether or not a predetermined condition is satisfied;

display means for displaying information regarding surroundings of the present position on the basis of the present position sensed by said present-position sensing means and the guidance information stored in said storage means; and guidance control means for controlling information displayed on said display means;

wherein said guidance control means has sorting means for sorting building shapes from the information regarding building shapes stored in said storage means, so that the information regarding building shapes is sorted on the basis of a result of judgment by said condition judging means, and information displayed on said display means is controlled on the basis of the information regarding building shapes sorted by said sorting means.

16. The system according to claim 15, wherein said present-position sensing means has vehicle speed sensing means for sensing a vehicle speed; said condition judging means judges whether or not the vehicle speed sensed by said vehicle speed sensing means is greater than a predetermined value; and said guidance control means controls information displayed on said display means on the basis of a result of judgment by said condition judging means.

17. The system according to claim 15, wherein said condition judging means judges whether or not the predetermined condition is satisfied on the basis of scrolling of a screen, so that information displayed on said display means is controlled on the basis of a result of judgment by said condition judging means.

18. The system according to claim 15, wherein said guidance control means, when said condition judging means judges that the predetermined condition is satisfied, reads only the information regarding building shapes sorted by said sorting means from said storage means, and executes processing for displaying a map.

19. The system according to claim 15, wherein said guidance control means, when said condition judging means judges that the predetermined condition is satisfied, changes a display color for the information regarding building shapes sorted by said sorting means to a color which is the same as a background color.

20. A navigation system for providing road guidance by displaying a structure-shape map showing building shapes and roads, said navigation system comprising:

recording-medium read means for reading out, from a recording medium, a program and data for drawing building shapes and roads on said structure-shape map and displaying said structure-shape map to provide road guidance;

non-volatile recording means for storing a program;

program read means for reading the program read out by said recording-medium read means into said non-volatile recording means;

display means for displaying said structure-shape map; and processing means for executing the program read into said non-volatile recording means by said program read means, thereby displaying said structure-shape map on said display means on the basis of the data recorded on said recording medium, which is read out through said recording-medium read means, to provide road guidance;

wherein drawing of building shapes is restricted according to a specific condition when said structure-shape map is displayed on said display means.

21. A recording medium for a navigation system which provides road guidance by displaying a structure-shape map showing building shapes and roads, said recording medium having the record of:

structure-shape map data having information regarding shape of each of various structures, and information belonging to each of said structures; and a program for drawing and displaying a shape and name of each structure on the basis of said structure-shape map data and for restricting drawing of building shapes according to a specific condition.

22. A navigation system comprising:

input means for entering a telephone number;

storage means for storing a set of position coordinates corresponding to each telephone subscriber's number, a set of representative position coordinates corresponding to an office number, and map data having information regarding shape of each of various structures, and information belonging to each of said structures, including a telephone number thereof;

display means for displaying a structure-shape map showing a shape and name of a structure on the basis of the information regarding shape in the map data stored in said storage means; and retrieval and guidance control means for retrieving a telephone number stored in said storage means on the basis of a telephone number entered by said input means and for displaying, on said display means, a structure-shape map centered on a structure having the retrieved telephone number.

23. The system according to claim 22, wherein said retrieval and guidance control means sets a retrieval range from said position coordinates or representative position coordinates on the basis of said entered telephone number, and retrieves telephone numbers included in information belonging to structures within said retrieval range.

24. A navigation system comprising:

storage means for storing map data having information regarding shape of each of various structures, and information belonging to each of said structures, including a telephone number thereof; and guidance control means for retrieving, upon entry of a telephone number, a telephone number corresponding to said entered telephone number from said information belonging to each of said structures, and for displaying a structure-shape map centered on a structure having the retrieved telephone number.

25. The system according to claim 24, wherein said information belonging to each of said structures includes a name, address, classification and height of each of said structures, and detailed information belonging to each of said structures, said detailed information having information indicating the number of names belonging to each of said structures, and for each of said names, information indicating a telephone number, a room number, and a category.

26. The system according to claim 24, wherein said storage means stores telephone-number data having a coordinate value corresponding to each telephone number, and said guidance control means obtains a coordinate value corresponding to a telephone number from said telephone-number data, determines a retrieval range from said coordinate value, and retrieves telephone numbers in said information belonging to said structures within said retrieval range.

27. The system according to claim 24, wherein said storage means stores a set of representative location coordinates of each office number in said telephone-number data, and said guidance control means, when there is no coordinate value corresponding to said entered telephone number in said telephone-number data, displays a structure-shape map centered on the representative location coordinates.

28. The system according to claim 6, wherein said guidance control means decides a display mode on the basis of said number of names.

* * * * *